United States Patent
Taunton

(10) Patent No.: US 8,000,402 B2
(45) Date of Patent: Aug. 16, 2011

(54) SYSTEM AND METHOD FOR ACCELERATED PERFORMANCE OF QUADRATURE AMPLITUDE MODULATION (QAM) DECODING OPERATIONS IN A PROCESSOR

(75) Inventor: Mark Taunton, Cambridge (GB)

(73) Assignee: Broadcom Corporation, Irvine, CA (US)

( * ) Notice: Subject to any disclaimer, the term of this patent is extended or adjusted under 35 U.S.C. 154(b) by 1159 days.

(21) Appl. No.: 11/642,553

(22) Filed: Dec. 21, 2006

(65) Prior Publication Data

US 2008/0019462 A1    Jan. 24, 2008

Related U.S. Application Data

(60) Provisional application No. 60/832,140, filed on Jul. 21, 2006.

(51) Int. Cl.
*H04L 23/02* (2006.01)
*H04L 7/02* (2006.01)
*H04L 27/28* (2006.01)
*H04L 5/12* (2006.01)

(52) U.S. Cl. ........ 375/261; 341/107; 370/276; 375/241; 375/260; 375/262; 375/269; 375/320; 375/340; 375/341; 725/118

(58) Field of Classification Search ................... 341/107; 370/276; 375/241, 261, 262, 269, 320, 340, 375/341; 714/794; 725/118
See application file for complete search history.

(56) References Cited

U.S. PATENT DOCUMENTS

| | | | |
|---|---|---|---|
| 5,408,502 A * | 4/1995 | How | 375/340 |
| 6,175,316 B1 * | 1/2001 | Barsoum et al. | 341/54 |
| 2002/0057713 A1 * | 5/2002 | Bagchi et al. | 370/468 |
| 2003/0084394 A1 * | 5/2003 | Erving et al. | 714/755 |
| 2003/0145116 A1 * | 7/2003 | Moroney et al. | 709/249 |
| 2007/0033381 A1 * | 2/2007 | Wilson | 712/21 |

* cited by examiner

*Primary Examiner* — Dac V Ha
*Assistant Examiner* — Erin M File
(74) *Attorney, Agent, or Firm* — Sterne, Kessler, Goldstein & Fox P.L.L.C

(57) ABSTRACT

A system and method for accelerated performance of quadrature amplitude modulation (QAM) is provided. The system includes multiple general purpose registers and multiple execution units configured to decode a set of QAM tones in parallel or an individual QAM tone in response to a single instruction executable by the processor. Each of the plurality of execution units is configured to decode one of the set of QAM tones according to a constellation size associated with the one of the set of QAM tones. The QAM decoding method includes reading a constellation size value for each of a set of received input tones. For each tone in the set of input tones, an ideal point in a QAM constellation of the associated constellation size closest to the X and Y coordinates of the tone is determined. The data values of the ideal points are then stored in a destination register.

23 Claims, 14 Drawing Sheets

SYSTEM AND METHOD FOR ACCELERATED PERFORMANCE OF QUADRATURE AMPLITUDE MODULATION (QAM) DECODING OPERATIONS IN A PROCESSOR

CROSS REFERENCE TO RELATED APPLICATIONS

This application claims benefit of U.S. Provisional Application No. 60/832,140, filed Jul. 21, 2006, entitled "System and Method for Accelerated Performance of Quadrature Amplitude Modulation (QAM) Decoding Operations in a Microprocessor," which is incorporated herein by reference in its entirety.

FIELD OF THE INVENTION

The present invention relates generally to systems using multiple tone modulation schemes, and more specifically, to the design of a Quadrature Amplitude Modulation decoding instruction for processors in such systems.

BACKGROUND OF THE INVENTION

Multiple tone modulation schemes are currently used in a wide variety of communication systems. For example, discrete multi-tone (DMT) modulation is used with digital subscriber line (DSL) technologies, including ADSL (Asymmetric DSL) and VDSL (Very high speed DSL) techniques. A DMT modulated signal is the sum of a number of orthogonal sub-carriers (or "tones"). Data on each of the sub-carriers is independently modulated using a technique such as Quadrature Amplitude Modulation (QAM). For example, in DSL, DMT uses a large number of equally spaced tones (for example, 256, or 512, or more, up to a few thousand tones), each individually modulated by QAM to encode a number of data bits. The number of bits per tone is assigned based on the capacity of the tone. In widely-adopted DSL standards, each tone can be modulated by a maximum of 15 bits. A related form of multiple tone modulation is Carrier-less Orthogonal Frequency Division Multiplexing (COFDM), used for example in some types of digital television transmission. In COFDM it is common for all of the tones making up the signal to carry the same fixed number of bits, for example 6 bits per tone (also sometimes called 64-QAM) or 4 bits per tone (or 16-QAM), according to circumstances.

In outline, QAM conveys data by modulating the amplitude of two carrier waves of the same frequency that are in quadrature (i.e., out of phase with each other by 90°). These two carrier waves can alternatively be considered as a single complex (2-dimensional) wave having a complex amplitude. In QAM, data to be transmitted is encoded by choosing a point representing its value from a regular 2-dimensional constellation of possible points. For example, a 2-bit constellation includes 4 possible data points (00, 01, 10, 11) and a 4-bit constellation includes 16 possible data points. As described above, the maximum number of bits per tone in DSL is 15. Therefore, the maximum constellation size used in DSL QAM is a 15-bit constellation, in which there are 32768 possible data points. Each possible point in a constellation grid has an associated X (real) coordinate value and Y (imaginary) coordinate value. The X and Y coordinate values together form the 2-dimensional (complex) amplitude to be applied by modulation to the two component carrier waves that make up the individual tone. Each tone in the total DMT signal can be modulated independently (discretely) with its own set of data bits, the size of which (and hence the constellation size of that tone) is determined by the capacity of the communication channel at that tone's particular frequency; the capacity is determined principally by the level of background noise that is measured at frequencies close to the tone's frequency. For example, a first tone, at a frequency with a certain noise level, might carry 4 bits, a subsequent tone, at a frequency with a somewhat higher noise level, only 3 bits, the next tone with less noise than the first, 5 bits, the one after that, with less noise still, 7 bits, etc.

On a higher level, each segment in time, or symbol, of the transmitted DMT signal is formed from the summation of all the modulated tones, over a fixed period. (Commonly, the period of the symbol is the least common multiple of the periods of the individual sub-carrier waves, or is related to it, for example by being a defined factor (such as 17/16) longer; this type of arrangement is used in both ADSL and VDSL.) In each symbol, a collection of data bits to be transmitted is subdivided into multiple sub-sets according to the capacities of the associated tones. Each subset is modulated onto its respective tone for the duration of the symbol; then the next collection of data bits to be transmitted is sub-divided and modulated onto the tones for the duration of the next symbol, and so on. In DSL, the fixed period of each symbol is typically a few hundred microseconds, leading to a symbol frequency of a few thousands of times per second. Different DSL standards support different symbol frequencies: for example 4000 Hz and 8000 Hz are used in various modes of VDSL, while ADSL normally uses a symbol frequency of approximately 4059 Hz.

As transmitted, the chosen constellation point for each of the tones together comprising the DMT signal in a given symbol is exactly (or near-exactly) aligned with a particular position on the notional grid representing all possible points. It is in that sense ideally represented in the transmitted signal. However, in any practical communication link, noise and other distortions affect the transmitted signal before it reaches the receiver at the other end of the link. The signal as received is therefore different from the signal as transmitted. It is the function of the receiver to extract, as accurately as possible, the information originally modulated to create the "ideal" DMT signal from the—somewhat distorted or corrupted— signal that is actually received.

Upon receipt of each DMT symbol, after some initial processing in the receiver, the QAM demodulator examines the received symbol to identify the individual tones with their complex amplitudes, and for each received tone estimates the value of the data actually transmitted on the tone, based on the observed complex amplitude (X and Y coordinates) of the tone. The estimated value (the most likely one to have been transmitted) is selected by determining the "ideal point" on the constellation grid which is closest to the actual position (X,Y coordinates) of the tone as received.

In order to increase flexibility in modem development and application, it has become more common to use software to perform functions, such as QAM decoding, in a DMT receiver. However, performing the QAM decoding operation purely in software is complex and uses a significant number of CPU cycles to decode a single tone. For technologies requiring a large amount of decoding, such as VDSL in which there may be thousands of tones in each symbol, and thousands of symbols per second to demodulate, the QAM decoding process represents a significant portion of the total computational cost for a software-based DMT receiver.

What is therefore needed is a system and method that significantly reduce the number of cycles needed to perform QAM decoding operations, thereby accelerating the QAM decoding process.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

Figure 1:
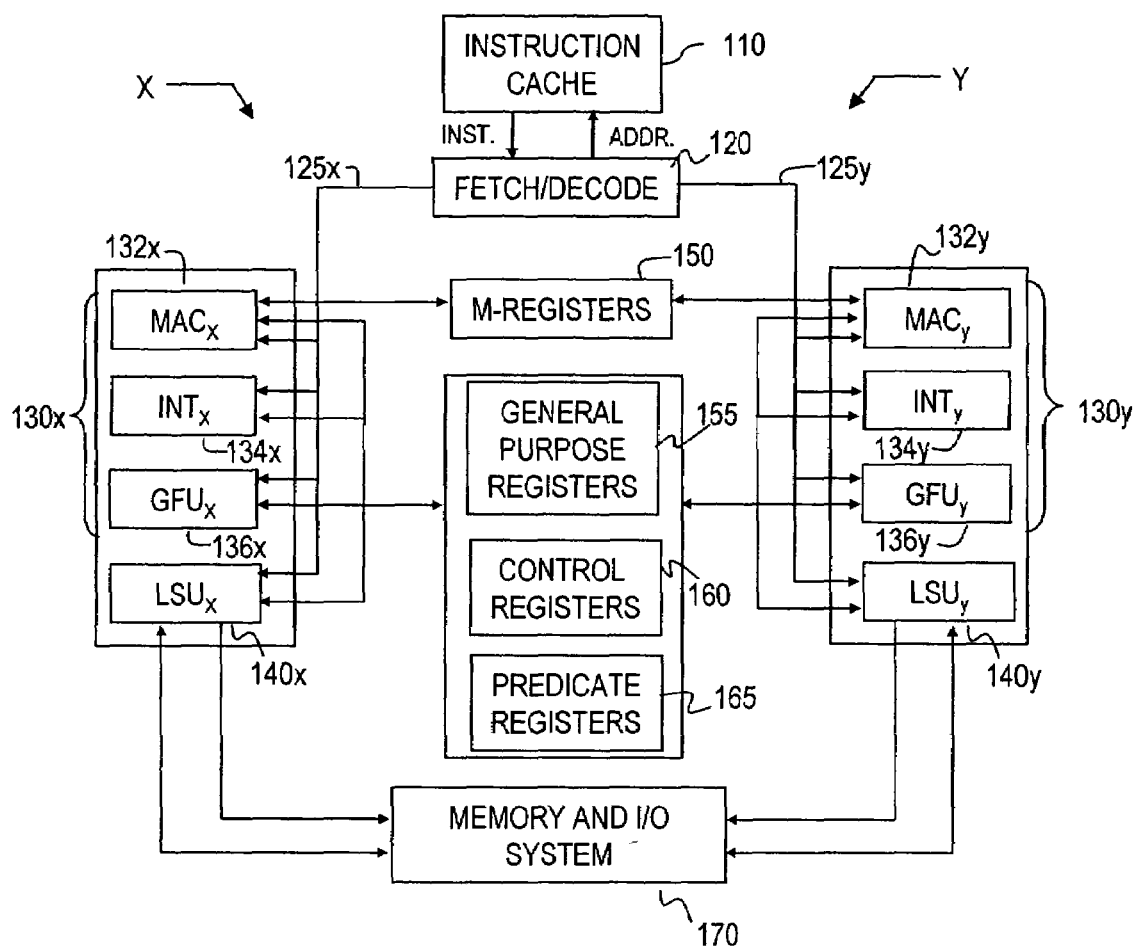
FIG. 1 illustrates an exemplary processor system for use in the present invention.

The present invention will now be described with reference to the accompanying drawings. In the drawings, like reference numbers can indicate identical or functionally similar elements. Additionally, the left-most digit(s) of a reference number may identify the drawing in which the reference number first appears.

DETAILED DESCRIPTION OF THE INVENTION

1. Architecture Overview

FIG. 1 illustrates an exemplary processor system 100 for use in the present invention. In an embodiment, the processor system is a 64-bit long instruction word machine including two parallel Single Instruction Multiple Data (SIMD) units designated by reference letters X and Y. In a SIMD processor, a single instruction can be issued to control the processing of multiple data values in parallel. As would be appreciated by a person of skill in the art, other configurations for processor system 100 can be used with the present invention.

Processor system 100 includes an instruction cache 110 for receiving and holding instructions from a program memory (not shown). The instruction cache 110 is coupled to fetch/decode circuitry 120. The fetch/decode circuitry 120 issues addresses in the program memory from which instructions are to be fetched and receives on each fetch operation a 64 bit instruction from the cache 110 (or program memory). In addition, the fetch/decode circuitry 120 evaluates an opcode in an instruction and transmits control signals along channels 125$x$, 125$y$ to control the movement of data between designated registers and the Multiplier Accumulator (MAC) 132, Integer (INT) Unit 134, Galois Field Unit (GFU) 136, and Load/Store Unit (LSU) 140 functional units.

Processor system 100 includes two SIMD execution units 130$x$, 130$y$, one on the X-side of the machine and one on the Y-side of the machine. Each of the SIMD execution units 130$x$, 130$y$ may include a Multiplier Accumulator Unit (MAC) 132, an Integer Unit (INT) 134, and a Galois Field Unit (GFU) 136. Multiplier accumulator units 132$x$, 132$y$ perform the process of multiplication and addition of products commonly used in many digital signal processing algorithms. Integer units 134$x$, 134$y$ perform many common operations on integer values used in general computation and signal processing. Galois field units 136$x$, 136$y$ perform special operations using Galois field arithmetic such as may be executed in implementations of the Reed-Solomon error protection coding scheme. As would be appreciated by a person of skill in the art, processor system 100 may include additional execution units. Additionally, the components of an execution unit may vary.

Processor system 100 further includes a data memory and I/O system 170, comprising one or more section of read-write memory and I/O space, coupled to the X-side and Y-side SIMD units. A Load/Store Unit (LSU) 140$x$, 140$y$ is provided on the X and Y-side SIMD units. Load/store units 140$x$, 140$y$ perform accesses to the data memory and I/O system 170, either to load data values from the memory or I/O system 170 into the general purpose registers 155 or to store values to the data memory or I/O system 170 from the general purpose registers 155.

Although FIG. 1 depicts a direct connection between Load/store units 140$x$, 140$y$ and memory and I/O system 170, it would be possible to access memory by alternate means including an indirect route via a data cache. As would be appreciated by persons of skill in the art, additional or alternative memory storage and I/O implementations can be used with the present invention.

Processor system 100 includes MAC (Multiply-Accumulate) ("M-registers") 150 for holding multiply-accumulate results and multiple general purpose registers 155. In an embodiment, processor system 100 includes four M-registers and sixty-four general purpose registers. Processor system 100 also includes multiple control registers 160 and multiple predicate registers 165.

2. Quadrature Amplitude Modulation (QAM) Decode Instruction

Figure 2:
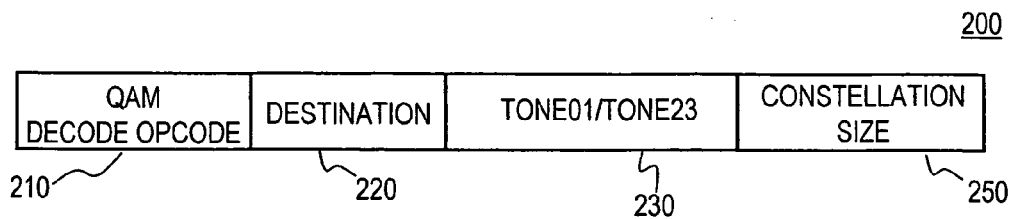
FIG. 2 illustrates an exemplary format for a quadrature amplitude modulation (QAM) decode instruction, according to embodiments of the present invention.

FIG. 2 illustrates an exemplary format for a quadrature amplitude modulation (QAM) decode instruction 200, according to embodiments of the present invention. QAM decode instruction 200 decodes received two-dimensional (X,Y) coordinate value (input point) data for multiple tones in parallel to determine the data bits which are assumed to have been modulated onto each tone, and writes the decoded data bit or bits for each tone into an output register. The decoding process finds the nearest ideal constellation point to the actual input point and generates the data value (also referred to as the "label") associated with that ideal point.

QAM decode instruction 200 includes a QAM decode opcode 210, a destination operand 220, a source tones operand 230, and a constellation size operand 250. In an embodiment, source tone operand 230 for "Tone01/Tone23" data is a reference to a consecutive pair of registers 155, indicated as the register number of the first register of the pair. In other embodiments, other ways of representing source tone operand 230 may be used, for example two separate registers may be referred to, using two sub-fields of source tones operand 230. The destination operand 220 is a reference to a register (e.g., a general purpose register 155) for writing the results of the operation (i.e., the decoded data bits for each tone). As will be appreciated by one skilled in the art, the particular layout of QAM decode instruction 200 as shown in FIG. 2 is only one of many possible arrangements. For example, the order of the parts of the instruction could vary; the various parts could individually be split into sub-parts; there could be additional bits in the instruction that relate to the particular implementation of QAM decoder instruction 200, or that may serve no specific purpose in relation to its implementation. In an alternative embodiment, not all of the operands of QAM decode instruction 200 need be specified explicitly in the instruction (although at least the opcode part 210 would be present); for example one or more of the operands could be implied as being a particular register or registers in processor 100, including one or more of the general purpose registers 155.

The destination register contains information allocated as multiple half-word fields (also referred to as lanes). In an embodiment, the decoded data is located at the right hand (least significant) end of the half-word field. As would be appreciated by persons of skill in the art, the decoded data may also be placed at the left hand (most significant) end of the half-word field in the present invention.

Figure 3A:
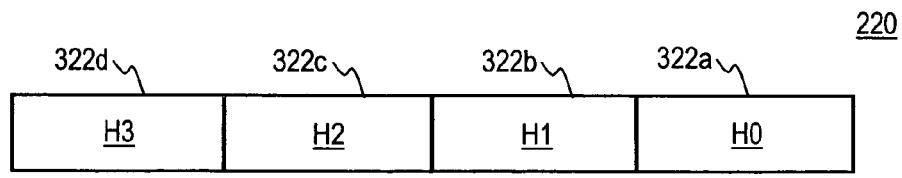
FIGS. 3A-D depict an exemplary destination register, exemplary Tone01 and Tone23 source registers, and an exemplary constellation size register, according to an embodiment of the invention.

FIG. 3A depicts an exemplary destination register 220. In an embodiment, destination register 220 contains sixty-four bits of information allocated as four sixteen-bit half-word lanes 322a-d. Each half-word lane contains the decoded data bits for its associated tone.

As would be appreciated by a person of skill in the art, smaller or larger register sizes (e.g., 32 bits or 128 bits) could be used and accordingly, the number of destination lanes could change. For example, one embodiment could use 4 8-bit lanes in a 32-bit register. In another example, there could be two 32-bit lanes in a 64-bit register or eight 16-bit lanes in a 128-bit register.

Figure 3B:
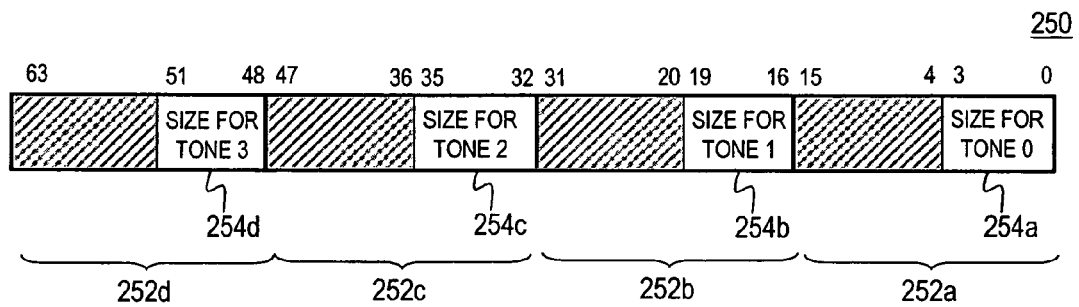

Constellation size operand 250 is a reference to a register (e.g., a general purpose register 155) which specifies the size of the constellation for each tone. The constellation size register includes multiple lanes, one per tone. The lowest x bits (e.g., the lowest 4 bits) of each lane give the size of the constellation to be used in decoding the two-dimensional input data for the corresponding tone. The remaining bits in the constellation size register are ignored. FIG. 3B depicts an exemplary constellation size register 250. Constellation size register 250 includes four sixteen-bit half word lanes 252a-d. The four least significant bits 254a-d in each lane define the constellation bit size. For example, bit field 254a defines the constellation bit size for tone 0.

Figure 3C:
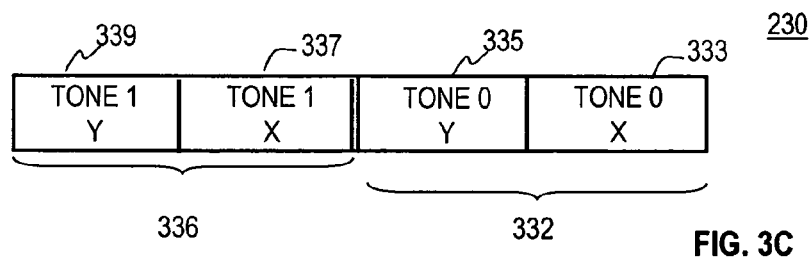
Figure 3D:
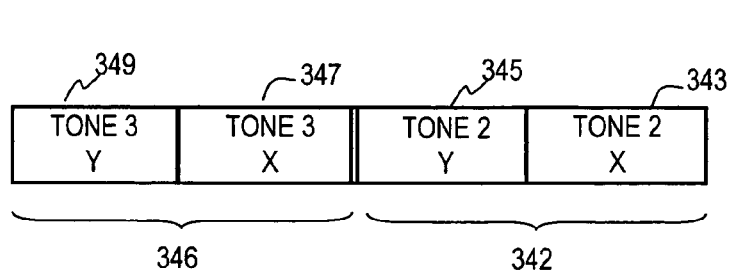

In an embodiment, Tone01/Tone23 operand 230 references a source register pair (e.g., two general purpose registers 155). The Tone01 register contains input data values for tones 0 and 1 and the Tone23 register contains input data values for tones 2 and 3. The input value for each tone comprises a pair (X,Y) of 16-bit coordinate values with the X coordinate in the lower half-word and the Y-coordinate in the upper half-word. FIGS. 3C and 3D depict exemplary Tone01 and Tone23 source registers. As shown in FIG. 3C, Tone 0 332 includes a 16-bit X coordinate 333 and a 16-bit Y coordinate 335. Tone 1 336 includes a 16-bit X coordinate 337 and a 16-bit Y coordinate 339. In another embodiment, the width of each coordinate could be of a different (smaller or larger) size, e.g. 8 bits, or 12 bits, or 20 bits, etc., according to circumstances. In an embodiment, the data stored in the Tone01 and Tone23 register pair is represented using two's complement notation. As would be appreciated by persons of skill in the art, other representation techniques could be used with the present invention.

The following is an exemplary QAM decode instruction using the format described above in FIG. 2.

QDECH data03, tone01/tone23, size03

In operation, the QAM decode instruction is implemented in a processor, such that the instruction performs the complete QAM decode process for a plurality of tones as a result of issuing a single QAM decode instruction 200. In an embodiment, the process is completed as a single operation during one cycle. In an embodiment, the instruction decodes 4 input tones in parallel during one cycle.

In an additional or alternative embodiment, a single tone may be decoded by an execution unit in response to a single QAM decode instruction, such as described above. In this embodiment, the data values associated with the additional tones may be set to a dummy value (e.g., all zeros) and/or ignored by the execution unit. In an embodiment using a narrower width of processing and general register storage (e.g. 16 bits, or 32 bits, as compared with 64 bit s), there may only be sufficient width to represent a single tone to be decoded in each register. Alternatively, a modified QAM decode instruction, not including operands associated with the additional tones, could be used.

2.1 QAM Decode Operation Overview

Figure 4:
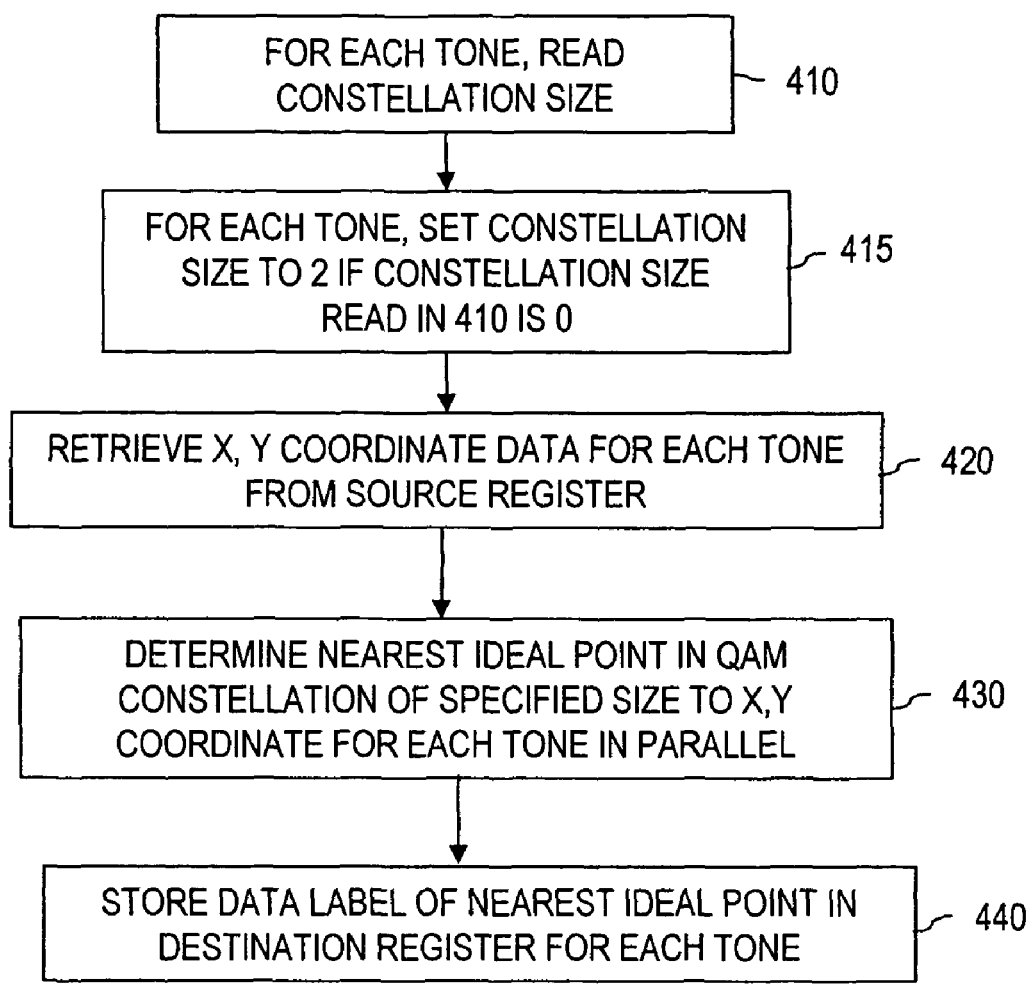
FIG. 4 depicts a flowchart of exemplary high level operation of an instruction, according to embodiments of the present invention.

FIG. 4 depicts a flowchart 400 of exemplary high level operation of instruction 200, according to embodiments of the present invention. Note that some of the steps in flowchart 400 do not necessarily have to occur in the order shown.

In step 410, the size of the constellation (also referred to herein as variable "N") to be used to decode the input data for one or more tones being processed is read. Each tone being decoded has an associated constellation size, so the value of N can be different for each tone being processed in one operation.

In step 415, the constellation size for decoding a tone is set to 2 if the constellation size read in step 410 is equal to zero.

In step 420, the X coordinate value and Y coordinate value (also referred to herein as the "X,Y coordinate pair", or as the "input point") for each received input tone is read.

Figure 5:
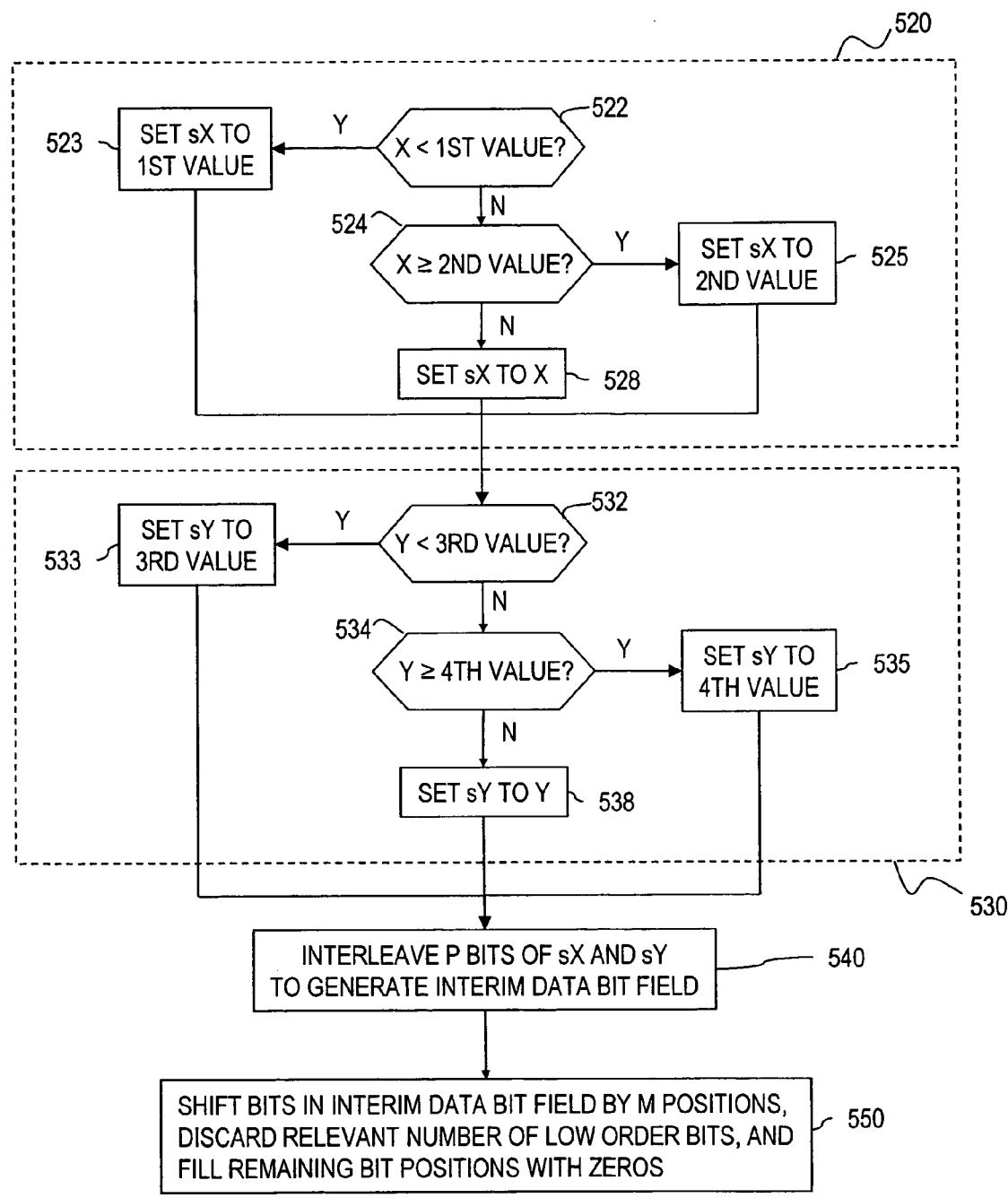
FIG. 5 depicts a flowchart of an exemplary QAM decode operation for an even size constellation, according to embodiments of the present invention.
Figure 8:
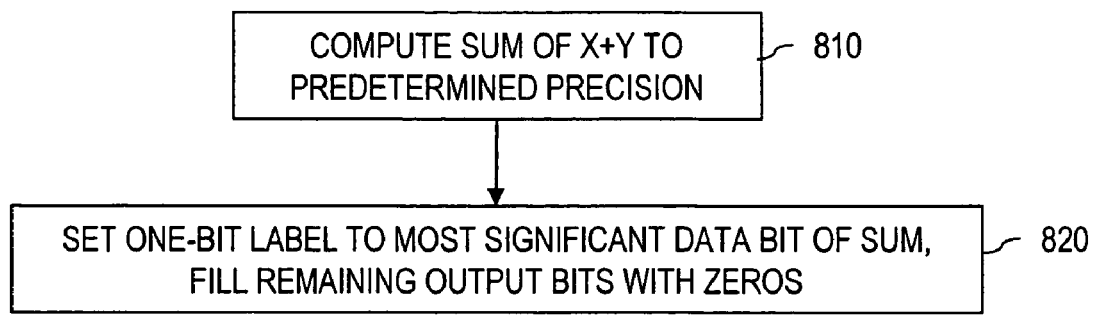
FIG. 8 depicts a flowchart of an exemplary QAM decode operation for decoding a 1-bit constellation, according to embodiments of the present invention.
Figure 10:
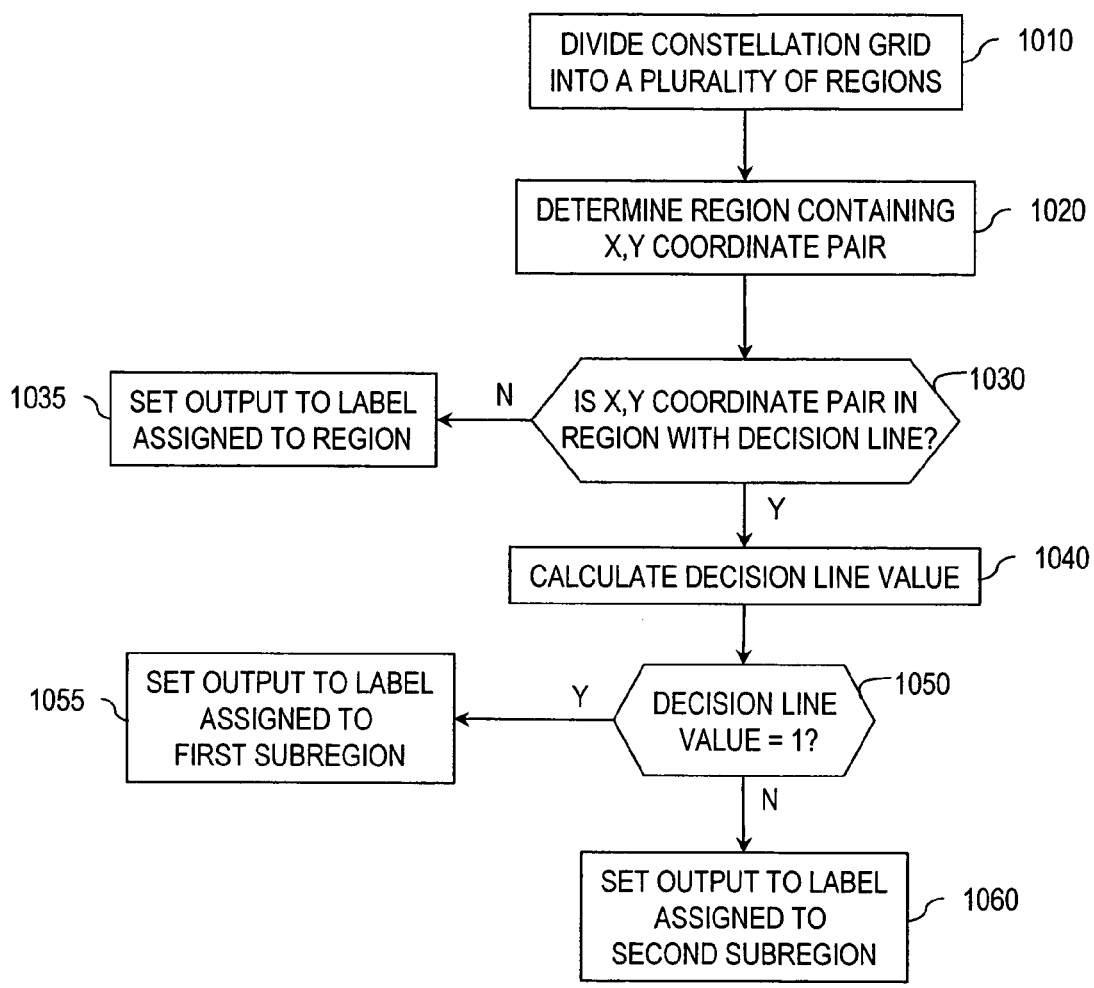
FIG. 10 depicts a flowchart of an exemplary QAM decode operation for decoding a 3-bit constellation, according to embodiments of the present invention.
Figure 13:
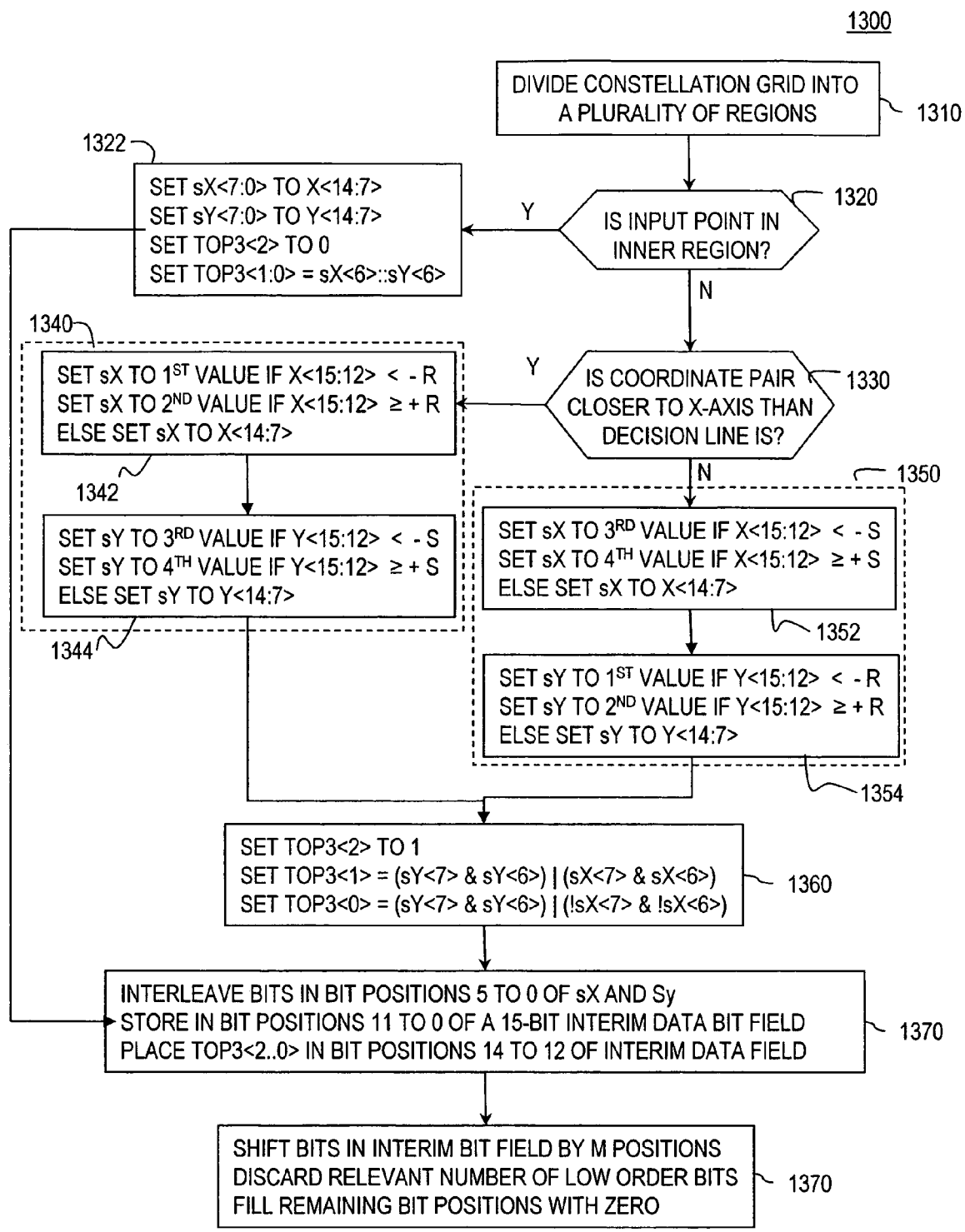
FIG. 13 depicts a flowchart of an exemplary QAM decode operation for decoding an odd size constellation having 5 or more bits, according to embodiments of the present invention.

In step 430, the nearest ideal point in the QAM constellation of the size read in step 410 or set in step 415 to the X,Y coordinate pair is determined for each tone. If multiple tones are being processed, this step is done in parallel or substantially in parallel for each tone. The instruction uses a combination of arithmetic and decision logic to decide the nearest ideal point. FIG. 5 describes the decoding performed in this step for even size constellations (e.g., N=2, 4, 6, 8, 10, 12, and 14). FIG. 8 describes the decoding performed in this step for a 1-bit constellation. FIG. 10 describes the decoding performed in this step for a 3-bit constellation. FIG. 13 describes the decoding performed in this step for odd size constellation of size 5 or more (e.g., N=5, 7, 9, 11, 13, and 15). Note that for multiple tones, a single instruction requires multiple instances of the decode processes described in FIG. 5, 8, 10, or 13 to be performed in parallel. The exact set of decode processes used in the instruction is based on the constellation size for the tones being processed.

In step 440, for each tone, the data label (i.e. an N-bit value) associated with the nearest ideal point determined in step 430 is stored in the appropriate lane of the destination register.

2.2 QAM Decode Process for Even Size Constellations

Figure 6:
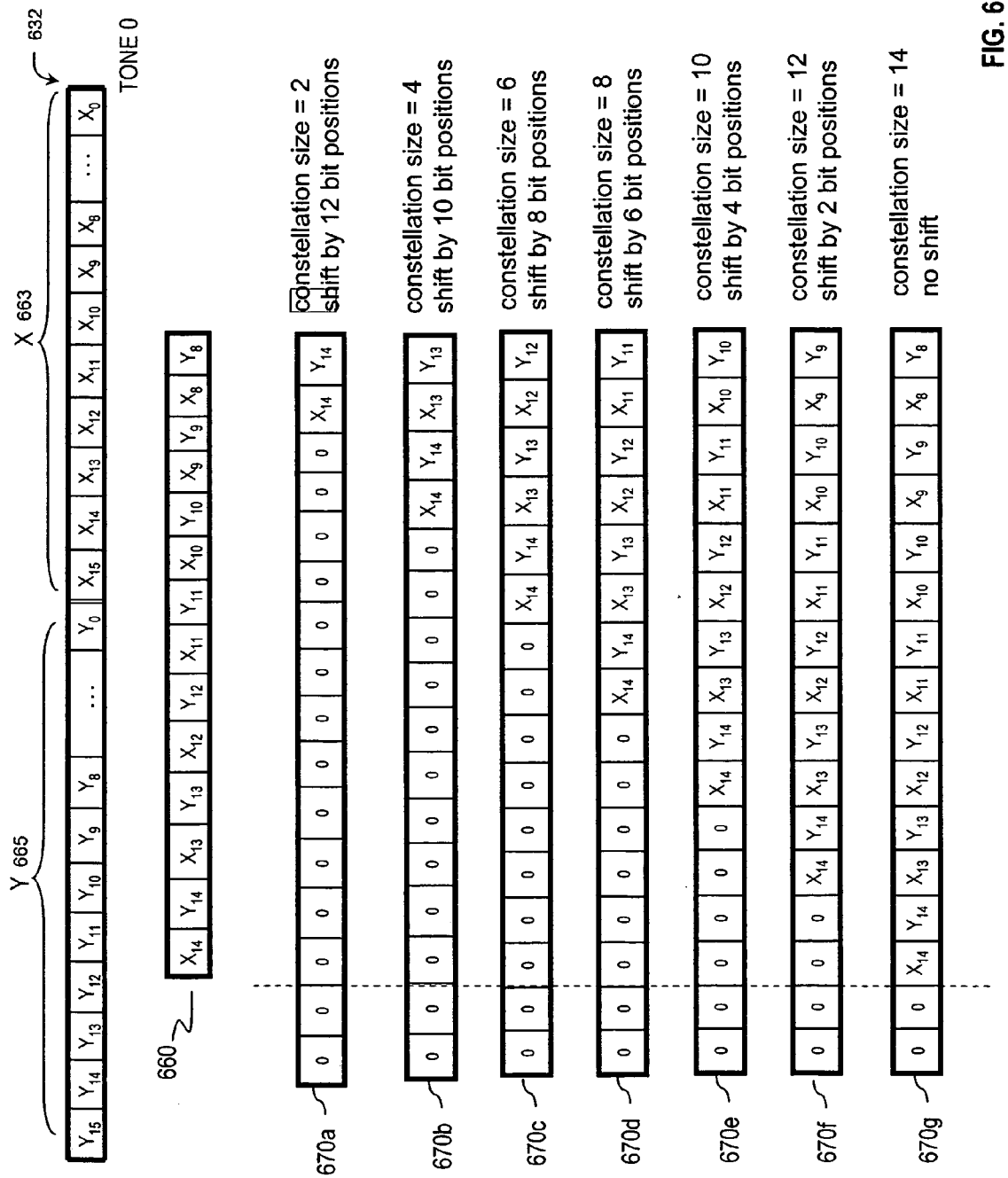
FIG. 6 illustrates an example decode operation for an even size constellation, according to an embodiment of the present invention.
Figure 7B:
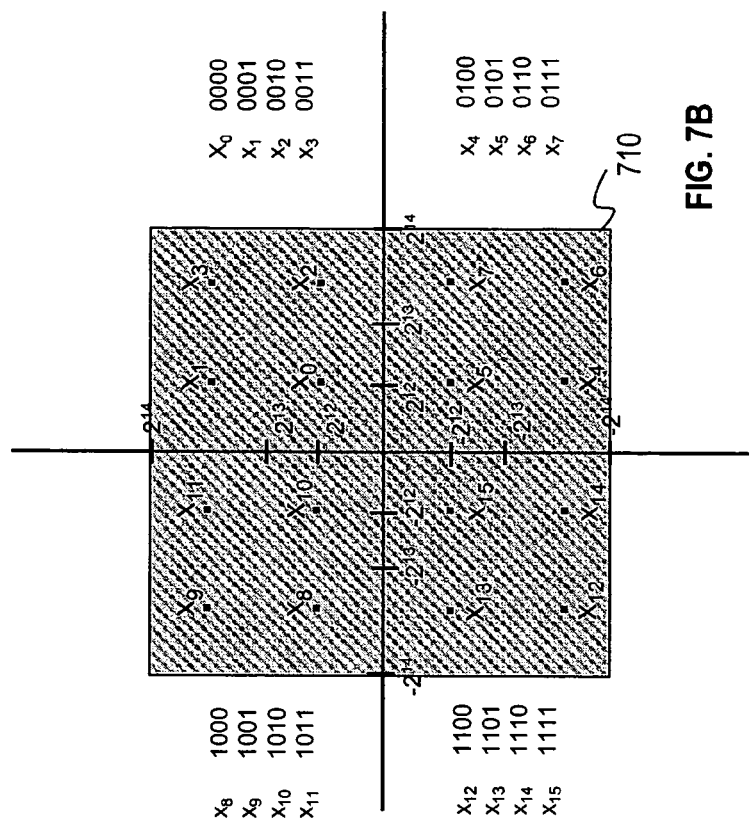
FIGS. 7A and 7B depict exemplary 2-bit and 4-bit constellations.
Figure 7A:
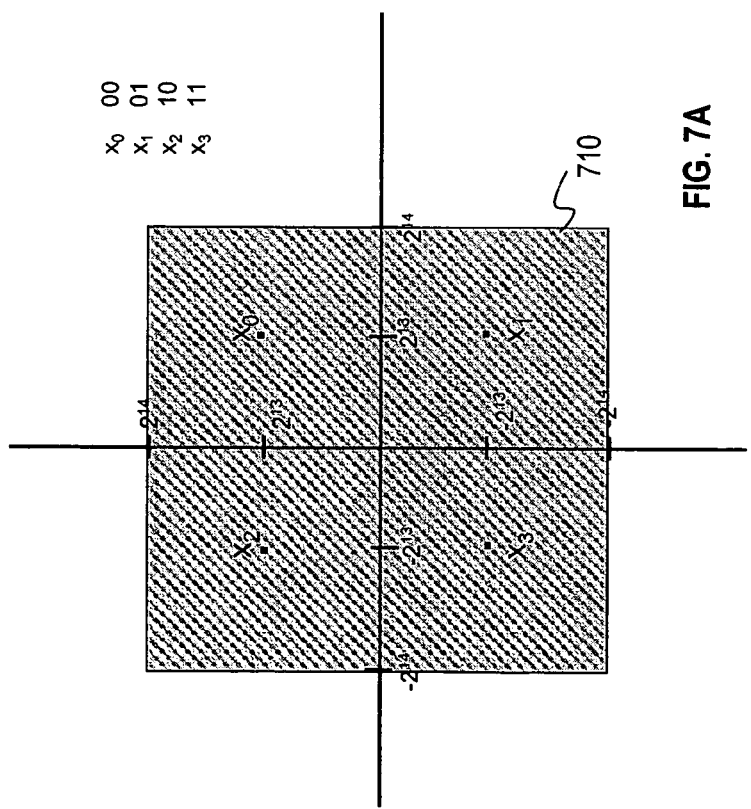

FIG. 5 depicts a flowchart 500 of an exemplary QAM decode operation for an even size constellation, according to embodiments of the present invention. Flowchart 500 is described with reference to the examples depicted in FIGS. 6, 7A, and 7B. However, flowchart 500 is not limited to those examples. FIGS. 7A and 7B depict exemplary 2-bit and 4-bit constellations, respectively. Note that some of the steps in flowchart 500 do not necessarily have to occur in the order shown.

In the 2-bit constellation depicted in FIG. 7A, the decoding process decodes an input (X,Y) coordinate pair in the first Quadrant as $x_0$ (00), a pair in the second Quadrant as $x_2$ (10), a pair in the third Quadrant as $x_3$ (11), and a pair in the fourth Quadrant as $x_1$ (01). In the 4-bit constellation depicted in FIG. 7B, the distance between the constellation points is halved relative to the 2-bit constellation.

In general, for even sized constellations, all normal-range signals occur within a single region (referred to as the "valid region"). In an embodiment, the boundaries of the valid region are defined as the two's complement range for a 15-bit number, $-2^{14}$ to $2^{14}-1$, inclusive. As can be seen in the exemplary constellations of FIGS. 7A and 7B, all the ideal points for a 2-bit and a 4-bit constellation occur within valid region 710. However, because the QAM decode instruction must handle signals corrupted by noise, signals outside valid region 710 must be addressed. Tones that are received with either or both coordinate values corrupted by noise, such as to increase their amplitude beyond the bounds of the valid region, can be handled without further distortion. This is because the size of each received coordinate is 16 bits, which supports two's complement coordinates in the range $-2^{15}$ to $2^{15}-1$, inclusive. In the cases when the input X, Y coordinate pair does not lie within the valid region, a saturation process is performed. Through the saturation process, the effective input point used for decoding is set to equal the closest location on the edge of the valid region. Steps 520 and 530 describe this process of saturation. Note that steps 520 and 530 can occur in any order or in parallel.

In step 520, saturation processing is performed for the X coordinate value. Step 520 includes steps 522-528.

In step 522, a determination is made whether the X coordinate value is less than a first value. In an embodiment, the first value is set to $-2^{14}$. If the X coordinate value is less than the first value, operation proceeds to step 523. If the X coordinate value is greater than or equal to the first value, operation proceeds to step 524.

In step 523, the saturated X coordinate value (sX) is set to the first value.

In step 524, a determination is made whether the X coordinate value is greater than or equal to a second value. In an embodiment, the second value is set to $2^{14}$. If the X coordinate value is greater than or equal to the second value, operation proceeds to step 525. If the X coordinate value is less than the second value, operation proceeds to step 528.

In step 525, the saturated X coordinate value (sX) is set to the second value minus one. Note that the flowchart 500 assumes that data is represented using two's complement notation. As would be appreciated by persons of skill in the art, other techniques for representing data could be used with the present invention.

In step 528, the saturated X coordinate value (sX) is set to the input X coordinate value. Step 528 represents the case where the X coordinate value lies within the valid region.

In step 530, saturation processing is performed for the Y coordinate value. Step 530 includes steps 532-538.

In step 532, a determination is made whether the Y coordinate value is less than a third value. In an embodiment, the third value is set to $-2^{14}$. If the Y coordinate value is less than the third value, operation proceeds to step 533. If the Y coordinate value is greater than or equal to the third value, operation proceeds to step 534.

In step 533, the saturated Y coordinate value (sY) is set to the third value.

In step 534, a determination is made whether the Y coordinate value is greater than or equal to a fourth value. In an embodiment, the fourth value is set to $2^{14}$. If the Y coordinate value is greater than or equal to the fourth value, operation proceeds to step 535. If the Y coordinate value is less than the second value, operation proceeds to step 538.

In step 535, the saturated Y coordinate value (sY) is set to the fourth value minus one.

In step 538, the saturated Y coordinate value (sY) is set to the input Y coordinate value. Step 538 represents the case where the Y coordinate value lies within the valid region.

In step 540, P bits of the saturated X and saturated Y coordinate values are interleaved to generate an interim data bit field. In an embodiment, 7 bits from each of the saturated X and saturated Y coordinate are interleaved. Note that if two's complement is used, the most significant bit represents a sign bit and is not used in the interleaving step. Instead, the next 7 most significant bits are used for each of the X and Y coordinate values. FIG. 6 depicts a 16-bit saturated X coordinate value (sX) 663 and a 16-bit saturated Y coordinate value (sY) 665 for tone 0. As shown in FIG. 6, the bits in bit positions 14 through 8 of the saturated X and Y coordinate values are interleaved to generate a 14-bit interim data bit field 660.

In step 550, the bits in the interim data bit field are shifted right by M places. In an embodiment, M is equal to 14 minus the size of the constellation (N). In addition, in step 550, the relevant number of low order bits (i.e., those "shifted out" of the register) are discarded. The bits remaining in the interim data bit field are stored in the least significant bit positions of the lane in the destination register for the tone. In an alternative embodiment, the decoded data bits are stored at another position in the respective lane of the destination register, e.g. at the most significant end, such that. the most significant bit of the decoded data is located in the most significant bit position of the lane in the destination register. The remaining bit positions in the lane are then filled with zeros. In alternative embodiments, other values than zero may be written to the remaining bit positions, or those bit positions in the destination register may be left unmodified. As would be appreciated by persons of skill in the art, other techniques for shifting the data could be used with the present invention.

FIG. 6 depicts the bit shifting of step 550 for constellation sizes 2, 4, 6, 8, 10, 12, and 14. For example, register 670a depicts the shifting of interim data bit field 660 for a constellation size 2. As shown in FIG. 6, the bits in the interim data bit field 660 are shifted right by 12 (14–2). This leaves two bits, $X_{14}$ and $Y_{14}$ remaining in the register. These two bits represent the ideal point closest to the original input X,Y coordinate pair. Note that in this example, the bits in bit positions 14 and 15 are also set to zero since the maximum size of the interim data field is 14 bits. In an alternative embodiment, the decoded data bits are stored at another position in the respective lane of the destination register, e.g. at the most significant end. The remaining bit positions are set to zero. In alternative embodiments, other values than zero may be written to the remaining bit positions, or those bit positions in the destination register may be left unmodified.

2.3 QAM Decode Process for Constellation of Size 1

Figure 9:
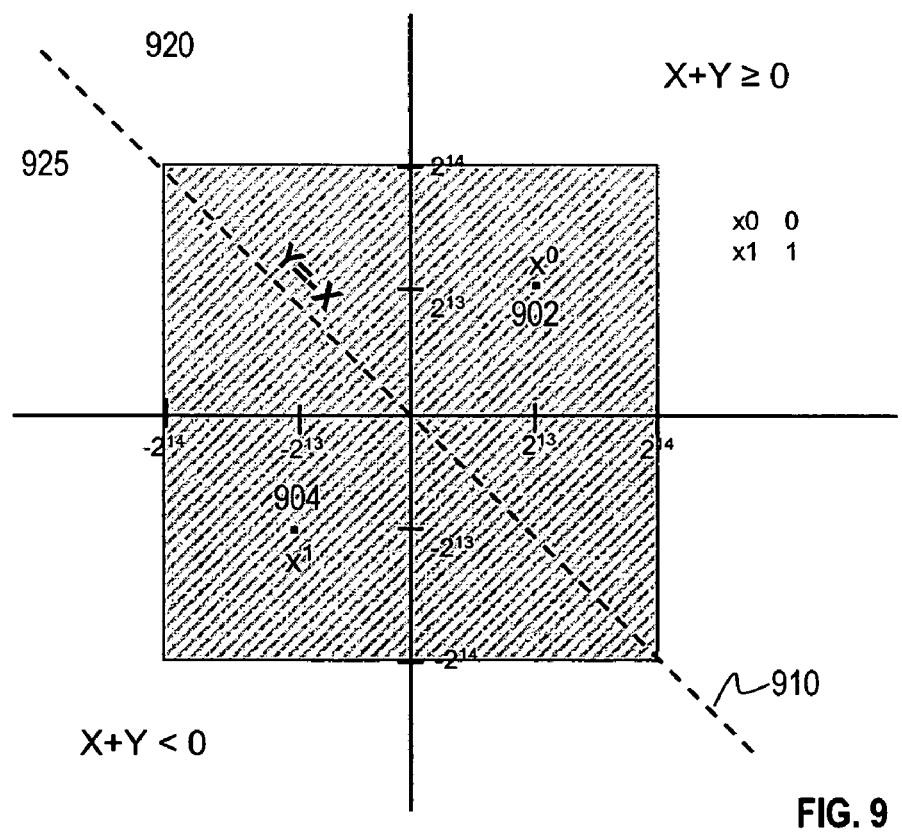
FIG. 9 depicts an exemplary 1-bit constellation.

FIG. 9 depicts an exemplary 1-bit constellation 900. Exemplary 1-bit constellation 900 includes two ideal points, $x_0$ (902) and $x_1$ (904). Ideal point $x_0$ (902) has an associated data value of 0 and ideal point $x_1$ (904) has an associated data value of 1. Decision line 910 separates the constellation grid into two regions 920 and 925. For the 1-bit constellation of FIG. 9, each ideal point has the same value for its X and Y coordinate. In decoding such a tone, any point above the decision line, or lying on decision line 910 defined by equation, $Y=-X$, is decoded as ideal point $x_0$ (902). Any point below the decision line is decoded as ideal point $x_1$ (904).

FIG. 8 depicts a flowchart 800 of an exemplary QAM decode operation for decoding a 1-bit constellation, according to embodiments of the present invention. Flowchart 800 is described with reference to the 1-bit constellation depicted in FIG. 9. However, flowchart 800 is not limited to that example. Note that some of the steps in flowchart 800 do not necessarily have to occur in the order shown.

In step 810, the sum of the input X coordinate and input Y coordinate for the tone is computed to a predetermined precision. In an embodiment, the precision of each coordinate value is reduced from 16 bits to 8 bits, by truncation of the least significant 8 bits of each, before the sum is performed. In another embodiment, a different level of input precision may be used, for example, 6-bit precision, or 16-bit precision. The full sum (including the carry bit out of the top-most bit position of the summing logic) is computed to yield a result represented using two's complement representation. The size of the sum is one bit larger than the size of the respective inputs; therefore, for an input precision of 8 bits, the sum would be computed to 9-bit precision, or if the input X and Y coordinate values are summed at 16 bit precision, the sum would be computed to 17-bit precision.

In step 820, the 1-bit label for the decoded data is set to the most significant bit of the two's complement sum. For example, if the sum is computed to 9-bit precision, the 1-bit label is set to the value of the bit in bit position 8 (where the bits are numbered from bit 0, the $0^{th}$ bit, as the least significant, through bit 8, the $8^{th}$ bit, as the most significant). That is, if the X,Y coordinate pair is above the decision line 910 then the output is set to 0. If the X,Y coordinate pair is below the decision line 910, then the output is set to 1. The 1-bit label is placed in the least significant bit position of the destination lane for the tone. In alternative embodiments the label may be placed in other bit positions in the destination lane, for example the most significant bit position. The remaining bits in the destination lane are then set to zero. In other embodiments the remaining bit positions may be set to other values, or left unmodified.

2.4 QAM Decode Process for Constellation of Size 3

Figure 11:
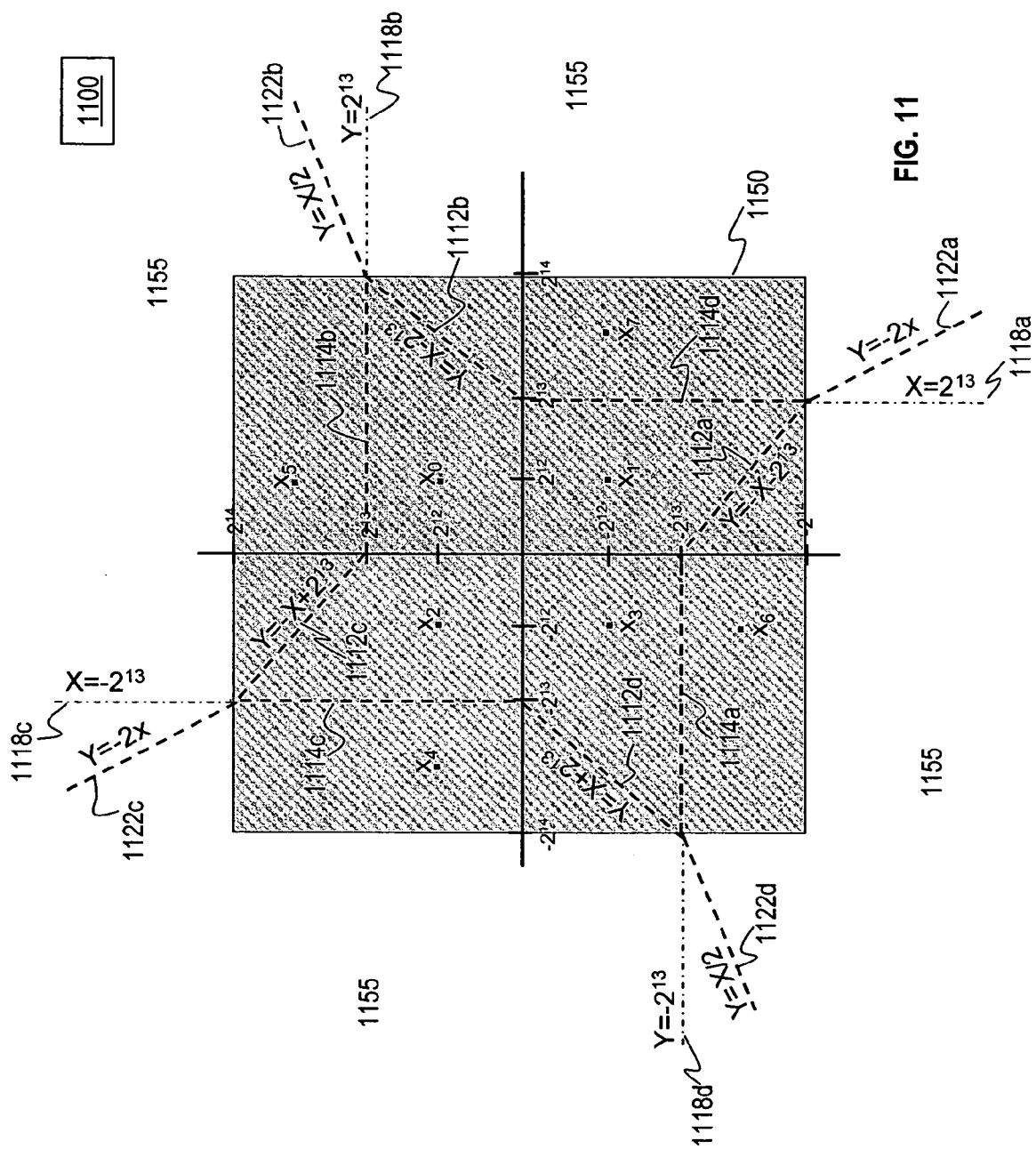
FIG. 11 depicts an exemplary 3-bit constellation.

FIG. 11 depicts an exemplary 3-bit constellation 1100. Exemplary 3-bit constellation 1100 includes eight ideal points, $x_0$ through $X_7$. The decoding of a 3-bit constellation is performed by identifying a point using multiple decision lines (shown dashed in FIG. 11) to partition the constellation space into regions. For input points within valid region 1150, sloped decision lines 1112a, b, c, and d and straight horizontal decision lines 1114a, b, and vertical decision lines 1116a, b are used.

The probability of a received tone's X, Y complex coordinate value occurring at a given point on the edge of valid region 1150 varies widely along the line of the edge, in accordance with the distance to the nearest ideal point. For example, the probability of having an input point which through corruption by noise lies in the region close to $(2^{14}, 2^{13})$ is much less than that of having an input point in the region close to $(2^{14}, -2^{13})$, since the distance to the nearest ideal point ($x_0$ or $x_5$) in the first case is more than twice the distance to the nearest ideal point ($x_7$) in the latter case. Noise events sufficient to cause such a degree of corruption as is implied in the first case should be exceedingly rare (and would almost certainly have serious consequences for other tones, also, so "correct" decoding may be irrelevant). Thus, the consequences of inaccurately decoding a point lying in the first region are far less serious than for the second region. Therefore, the cost of logic to perform an exact decoding for the outer region 1155 is often not warranted. Thus, approximate decoding for X,Y coordinate pairs in the outer region 1155 is performed using alternate decision lines 1118a, b, c, d instead of exact decisions lines 1122a, b, c, d. In an alternative embodiment, exact decision lines 1122a, b, c and d could be used if the most accurate possible decoding were required.

FIG. 10 depicts a flowchart 1000 of an exemplary QAM decode operation for decoding a 3-bit constellation, according to embodiments of the present invention. Flowchart 1000 is described with reference to the examples of FIGS. 11 and 12. However, flowchart 1000 is not limited to those examples. Note that some of the steps in flowchart 1000 do not necessarily have to occur in the order shown.

Figure 12:
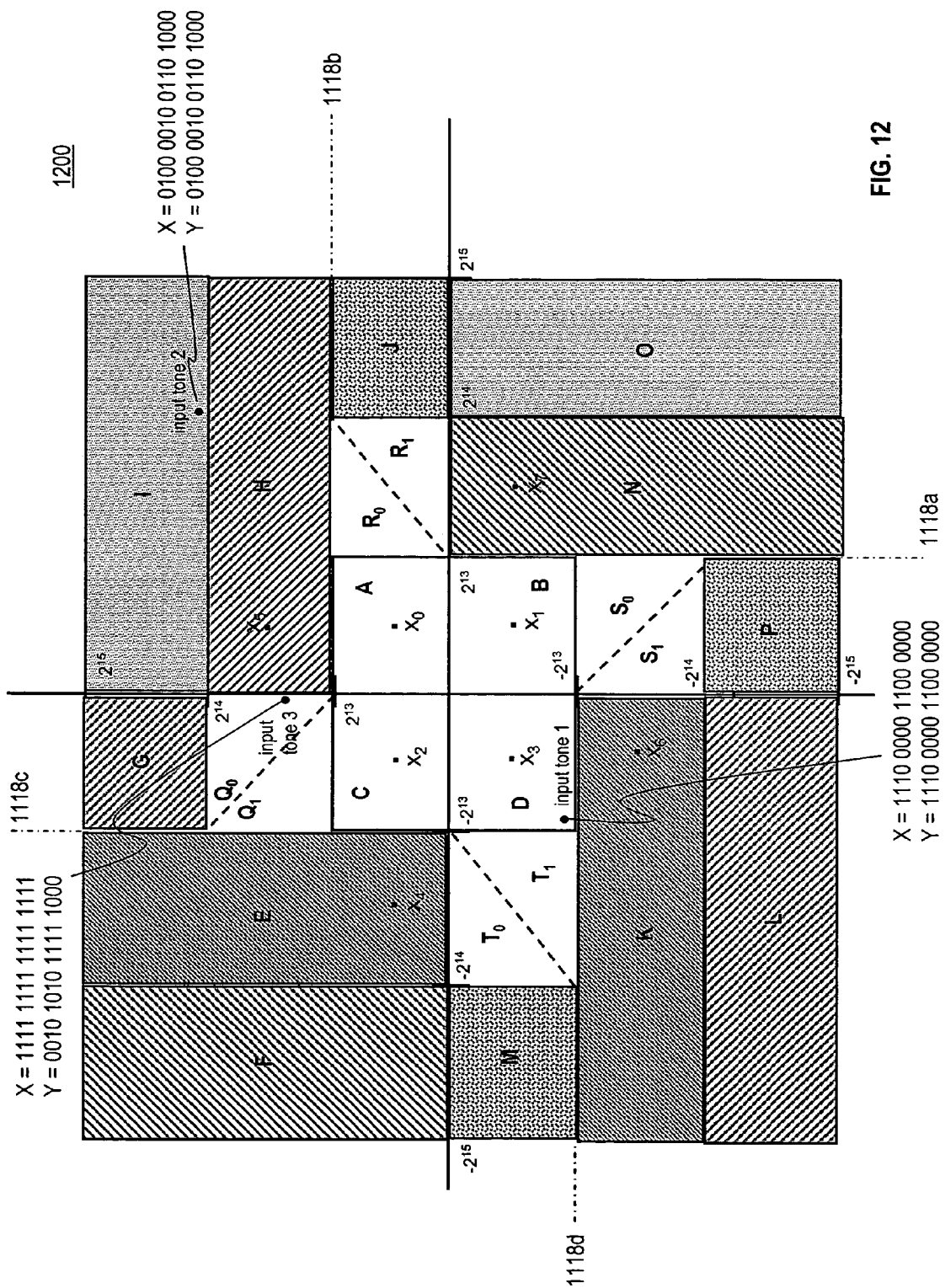
FIG. 12 depicts the division of the 3-bit constellation grid into 20 regions A-T, according to embodiments of the present invention.

In step 1010, the constellation grid is divided into a plurality of logical regions. FIG. 12 depicts the division of a 3-bit constellation grid into 20 regions A-T. The innermost four regions (A-D) lie within the boundaries defined by $X=\pm 2^{13}$ and $Y=\pm 2^{13}$. Regions outside the innermost four regions (A-D) are split into rectangular portions based on the alternative decision lines 1118a, b, c, and d. Four of the generated rectangular regions (regions Q-T) each include a sloped decision line 1112 separating the region into two sub-regions. Note that FIG. 12 is not drawn to the same scale throughout: the shapes of the outermost regions G-P are shown smaller in at least one dimension than they would appear with fixed scaling, in order to allow greater clarity of representation of the inner area.

In the example of FIG. 12, region D extends from $X=-2^{13}$ (1111 0000 0000 0000) to −1 (1111 1111 1111 1111) and from $Y=-2^{13}$ (1110 0000 0000 0000) to −1 (1111 1111 1111 1111). Region I extends from X=0 (0000 0000 0000 0000) to $2^{15}-1$ (0111 1111 1111 1111) and from $Y=2^{14}$ (0100 0000 0000 0000) to $2^{15}-1$ (0111 1111 1111 1111).

In step 1020, the region containing the input X,Y coordinate pair is determined. In an embodiment, the three most significant bits (i.e., in bit positions 15-13) are examined for the input X coordinate and input Y coordinate to make the region determination. As shown in FIG. 12, example input tone 1 has X<15...13> equal to 111 and Y<15...13> equal to 111. Therefore, input tone 1 lies within region D. Example input tone 2 has X<15...13> equal to 010 and Y<15...13> equal to 010. Therefore, input tone 2 lies within region I.

In step 1030, a determination is made whether the X, Y coordinate pair lies within a region having a decision line (e.g., region Q-T). If the region includes a decision line, operation proceeds to step 1040. If the region does not include a decision, operation proceeds to step 1035. In the example of FIG. 12, input tone 3 lies within a region including a decision line.

In step 1035, the decoded output data for the tone is set to the label assigned to the region. In the example of FIG. 12, the following assignments are made:

| If input tone in: | region A | 000 |
|---|---|---|
| | region B | 001 |
| | region C | 010 |
| | region D | 011 |
| | regions E, F, G | 100 |
| | regions H, I, J | 101 |
| | regions K, L, M | 110 |
| | regions N, O, P | 111 |

Therefore, decoded tone 1 lying is assigned label 011 (ideal point $x_3$) and decoded tone 2 is assigned label 101 (ideal point $x_5$).

In step 1040, the decision line value is calculated, by evaluating a decision line formula. The decision line formula that is evaluated is determined based on the region containing the X,Y coordinate pair. For example, the decision line formula is Y+X for regions Q and S and the decision line formula is Y−X for regions R and T. In the example of FIG. 12, the input point for tone 3 lies within region Q. The decision line value for input tone 3 is therefore evaluated by summing the X coordinate (1111 1111 1111 1111) and the Y coordinate (0010 1010 1111 1000). The result is (1 0010 1010 1111 0111). The result includes the carry bit or borrow bit from the arithmetic used in the evaluation of the formula. In an embodiment, relative to 16-bit precision for the input coordinate values, the decision line value is set to the bit in the $13^{th}$ bit position of the decision line result (numbered such that bit 0, the $0^{th}$ bit, is the least significant, and bit 1, the $1^{st}$ bit, the next more significant, etc.). The bit position from which the decision line value is taken is equivalently expressed as the $4^{th}$ most significant bit of the result, where the most significant (left-most, carry/borrow) bit is considered as the $1^{st}$ most significant bit. Therefore, for input tone 3, the decision line value is 1. In an embodiment, the precision of this calculation is reduced, and some of the least significant bits of the input X and Y coordinate values are disregarded (treated as 0) in the summation, since they make only a small contribution to the precision of the computation, and by that means the cost of the summation circuitry may be reduced. In an embodiment, the least significant 8 bits of each of X and Y are ignored (treated as zero) in this way. In other embodiments, fewer bits, or more bits, of the least significant bits of X and Y may be disregarded.

In step 1050, a determination is made whether the decision line value is 1. If the decision line value is 1, the input tone lies in a first sub-region of the region. In this case, operation proceeds to step 1055. If the decision line value is 0, the input tone lies in a second sub-region of the region. In this case, operation proceeds to step 1060.

In step 1055, the output is set to the label assigned to the first sub-region. In the example of FIG. 12, the first sub-region $Q_0$ is assigned label 101 (ideal point $x_5$). Therefore, input tone 3 lies in first sub-region, $Q_0$, and has label 101.

In step 1060, the output is set to the label assigned to the second sub-region. In the example of FIG. 12, the second sub-region $Q_1$ is assigned label 010.

2.4 QAM Decode Process for Odd Size Constellation of Size 5 Through 15

FIG. 13 depicts a flowchart 1300 of an exemplary QAM decode operation for decoding an odd size constellation having 5 or more bits, according to embodiments of the present invention. Flowchart 1300 is described with reference to the exemplary 5-bit constellation of FIG. 14 and the constellation grid of FIG. 15. However, flowchart 1300 is not limited to those examples. Note that some of the steps in flowchart 1300 do not necessarily have to occur in the order shown.

Figure 14:
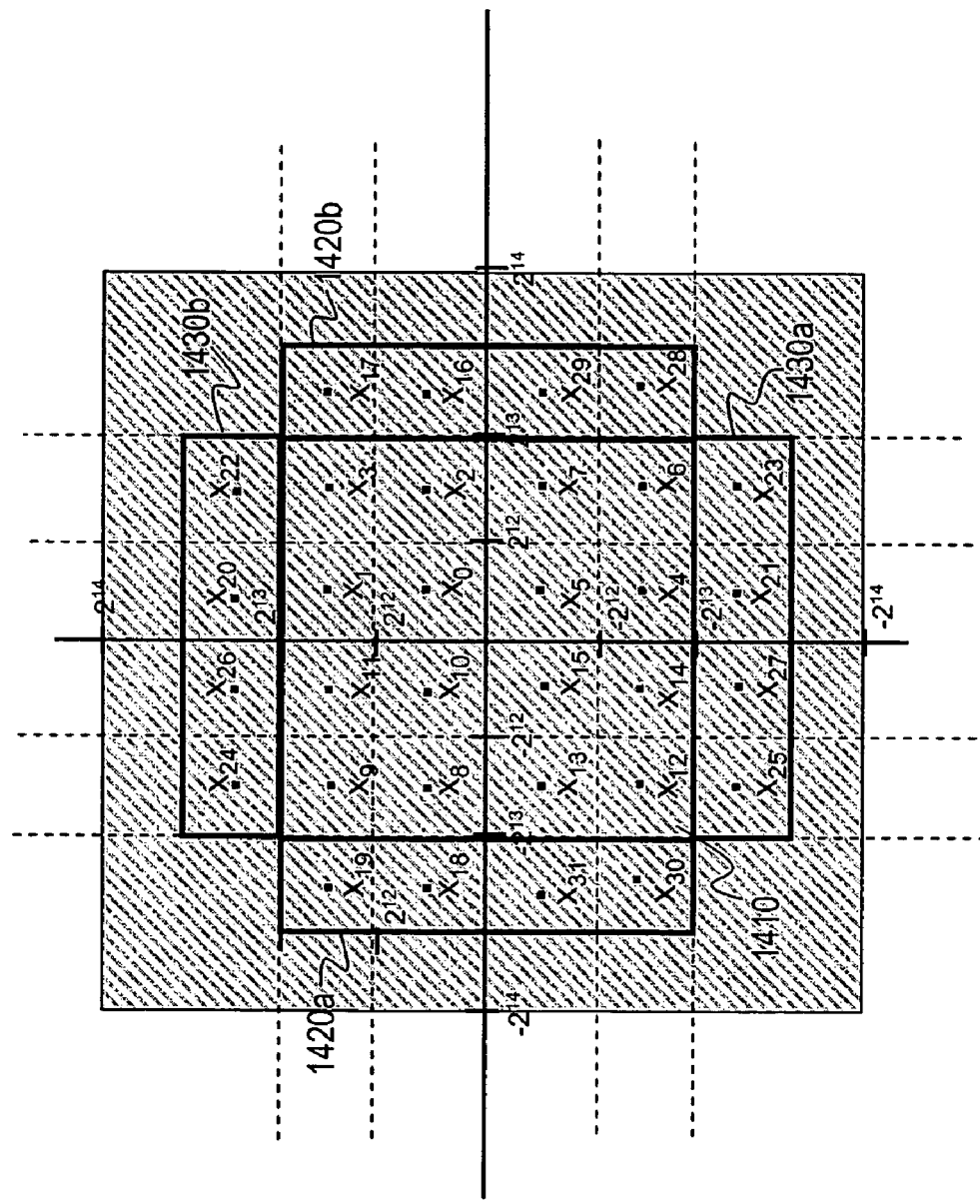
FIG. 14 depicts an exemplary 5-bit constellation.
Figure 15:
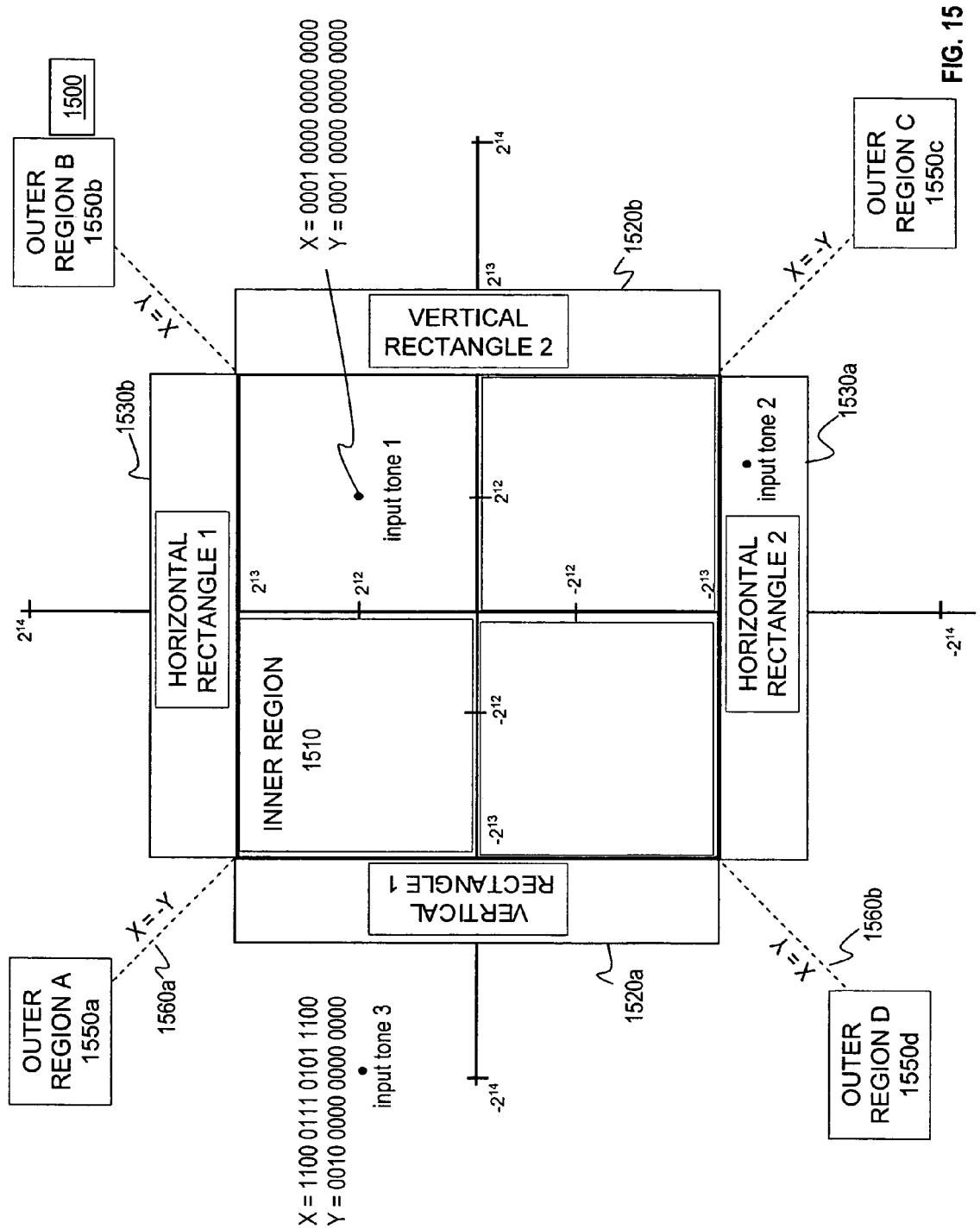
FIG. 15 depicts the division of a constellation grid into regions for a constellation of 5 or more bits, according to embodiments of the present invention.

In step 1310, the constellation grid is divided into a plurality of regions. As depicted in FIG. 15, constellation grid 1500 has a central inner region 1510, two vertical rectangular regions 1520a, 1520b, and two horizontal rectangular regions 1530a, 1530b. As shown in FIG. 14 for a 5-bit constellation, a first set of ideal points ($x_0$-$x_{15}$) lies within central inner region 1410. A second set of ideal points ($x_{18}$, $x_{19}$, $x_{30}$, $X_{31}$) lies within vertical rectangle 1420a, and so on.

As depicted in FIGS. 14 and 15, the boundaries of the inner region are defined by $X=\pm 2^{13}$ and $Y=\pm 2^{13}$. The boundaries for vertical rectangle 1520a are defined by $X=-(2^{13}+2^{12})$, $X=-2^{13}$, and $Y=\pm 2^{13}$. The boundaries for vertical rectangle 1520b are defined by $X=(2^{13}+2^{12})$, $X=2^{13}$, and $Y=\pm 2^{13}$. The boundaries for horizontal rectangle 1530a are defined by $X=\pm 2^{13}$, $Y=-(2^3+2^{12})$, and $Y=-2^{13}$. The boundaries for horizontal rectangle 1530b are defined by $Y=\pm 2^{13}$, $X=(2^{13}+2^{12})$, and $X=2^{13}$. In addition, constellation grid 1500 includes four outer regions 1550a-d exterior to central inner region 1510, vertical rectangular regions 1520, and horizontal rectangular regions 1530. Outer regions 1550a and 1550c are divided into sub-regions by decision line 1560a (X=−Y). Outer regions 1550b and 1550d are divided into sub-regions by decision line 1560b (X=Y).

In step 1320, a determination is made whether the X,Y coordinate pair lies within the central inner region. In the example of FIG. 15, example input tone I lies within central inner region 1510. If the X,Y coordinate pair lies within the central inner region, operation proceeds to step 1322. If the X,Y coordinate pair lies outside the central inner region, operation proceeds to step 1330.

In step 1322, the saturated X coordinate value (sX), the saturated Y coordinate value (sY), and the top bit data field (TOP) are set. Because the input value is within the inner region, a simple mapping is applied. Although the terms "saturated X coordinate value" and "saturated Y coordinate value" are used, no saturation is needed or applied in step 1322. The saturated X coordinate value is set to 8 bits of the input X coordinate (X<14:7>) and the saturated Y coordinate value is set to 8 bits of the input Y coordinate (Y<14:7>). Note that if two's complement representation is used, the most significant bit in the input X and Y coordinate value is ignored. The bit in bit position 2 of the top bit data field is set to 0, bit position 1 is set to sX<6>, and bit position 0 is set to sY<6>. Operation proceeds to step 1370.

In step 1330, a determination is made whether the X,Y input point lies closer to the X-axis than the closest location to it on the sloping decision line does (i.e. it lies between the sloping decision line and the X-axis) for the region containing the coordinate pair. Step 1330 is described in more detail below in the discussion of FIG. 16. If the X,Y coordinate pair lies closer to the X-axis than the closest location to it on the sloping decision line does, operation proceeds to step 1340. If the X,Y coordinate pair does not lie closer to the X-axis than the closest location to it on the sloping decision line does, operation proceeds to step 1350.

Figure 16:
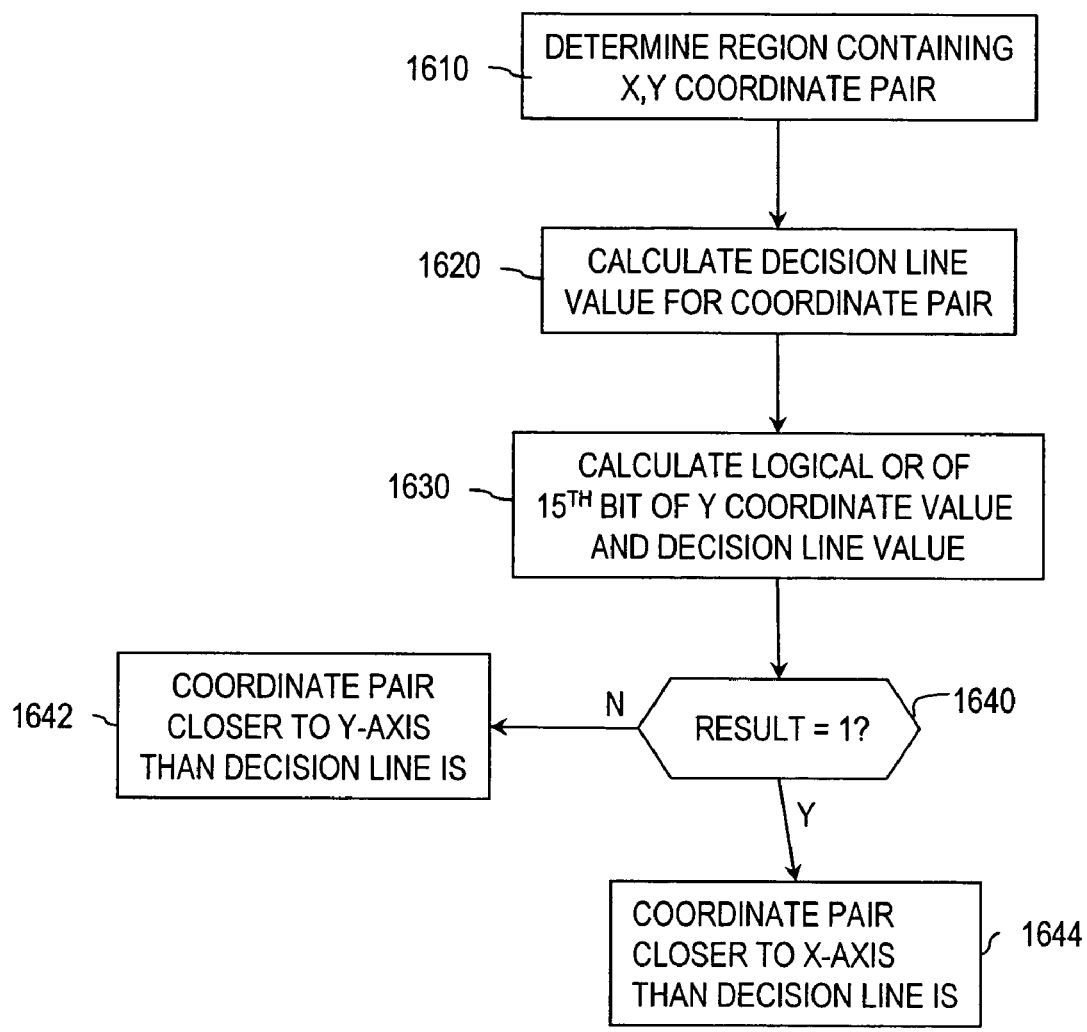
FIG. 16 depicts an exemplary flowchart of a method for determining whether a coordinate pair is closer to the X-axis than the closest location on the region decision line is.

FIG. 16 depicts an exemplary flowchart 1600 of a method for determining whether a coordinate point lies closer to the X-axis than does the closest location to it on the sloping decision line for the region. Note that some of the steps in flowchart 1600 do not necessarily have to occur in the order shown.

In step 1610, the quadrant containing the X,Y coordinate pair is determined. This can be done by examining the bit in the 15$^{th}$ bit position (numbering from the 0$^{th}$ bit, in position 0) of the X and Y input coordinate, assuming 16-bit precision. A bit 1 indicates a negative value and a bit 0 indicates a positive value. Therefore, if X<15> is 1 and Y<15> is 1, the pair lies in outer region D 1550d. As a further example, if X<15> is 1 and Y<15> is 0, the pair lies in outer region A 1550a.

In step 1620, a decision line value is calculated for the X,Y coordinate pair. The decision line value is set to the carry/borrow bit of the result of the decision line formula for the region containing the X,Y coordinate pair (e.g., the bit in bit position 16 <16> of the result). At a high level, step 1620 determines whether the input point lies above or below the decision line in the region. In the example of FIG. 15, for input tone 3, input X coordinate (1100 0111 0101 1100) is added to input Y coordinate (0001 0000 0000 0000), resulting in a 1 in the carry/borrow bit position.

In step 1630, bit 15 of the Y coordinate value is ORed with the decision line value.

In step 1640, a determination is made whether the result of the OR operation in step 1630 is true (i.e., 1). If the result is true, the input point is closer to the X-axis than the closest location to it on the sloping decision line is (step 1644). If the result is not true, the X,Y coordinate pair is closer to the Y-axis than the closest location to it on the decision line is (i.e. it lies between the decision line and the Y-axis) (step 1642).

Returning to FIG. 13, in step 1340, saturation to a vertical rectangle (e.g., 1520a, 1520b) is performed. Step 1340 is performed when the input point is closer to the X-axis than the closest location to it on the decision line is: Step 1340 includes steps 1342 and 1344.

In step 1342, the saturated value for the X coordinate is set. Three cases are anticipated in this step. In the first case, the saturated X coordinate is set to a first value if the 4 most significant bits of the X coordinate (X<15:12>), considered as a 4-bit two's complement binary number are less than –R in value. In the second case, the saturated X coordinate is set to a second value if the 4 most significant bits of the X coordinate have a value (when considered as a 4-bit two's complement binary number) greater than or equal to R. In the final case, the saturated X coordinate is set to bits 14 through 7 of the X coordinate value (X<14:7>). This represents the case where the X-value is within the valid range. In an embodiment, the first value is equal to (hexadecimal) –0x30 (decimal –48), the second value is equal to (hexadecimal) 0x2F (decimal 47), and R is equal to 3.

In step 1344, the saturated value for the Y coordinate is set. Three cases are also anticipated in this step. In the first case, the saturated Y coordinate is set to a third value if the 4 most significant bits of the Y coordinate (Y<15:12>) are less than –S. In the second case, the saturated Y coordinate is set to a fourth value if the 4 most significant bits of the Y coordinate are greater than or equal to S. In the final case, the saturated Y coordinate is set to bits 14 through 7 of the Y coordinate value (X<14:7>). This represents the case where the Y-value is within the valid range. In an embodiment, the third value is equal to –0x20 (decimal –32), the second value is equal to 0x1F (decimal 31), and S is equal to 2.

In step 1350, saturation to a horizontal rectangle (e.g., 1530a, 1530b) is performed. Step 1350 is performed when the input point is closer to the Y-axis than the decision line. Step 1350 includes steps 1352 and 1354.

In step 1352, the saturated value for the X coordinate is set. Three cases are anticipated in this step. In the first case, the saturated X coordinate is set to the third value if the 4 most significant bits of the X coordinate (X<15:12>) are less than –S. In the second case, the saturated X coordinate is set to the fourth value if the 4 most significant bits of the X coordinate are greater than or equal to S. In the final case, the saturated X coordinate is set to bits 14 through 7 of the X coordinate value (X<14:7>). This represents the case where the X-value is within the valid range. In an embodiment, the third value is equal to –0x20, the second value is equal to 0x1F, and S is equal to 2.

In step 1354, the saturated value for the Y coordinate is set. Three cases are also anticipated in this step. In the first case, the saturated Y coordinate is set to the first value if the 4 most significant bits of the Y coordinate (Y<15:12>) are less than –R. In the second case, the saturated Y coordinate is set to the second value if the 4 most significant bits of the Y coordinate are greater than or equal to R. In the final case, the saturated Y coordinate is set to bits 14 through 7 of the Y coordinate value (X<14:7>). This represents the case where the Y-value is within the valid range. In an embodiment, the first value is equal to –0x30, the second value is equal to 0x2F, and R is equal to 3.

In step 1360, the top bit data field (TOP) is set. Top bit data field has 3 bits. In an embodiment, the bit in the second bit position is set to 1. To determine the bit in the first bit position, the result of the logical AND of the bits in the 7$^{th}$ and 6$^{th}$ bit positions of the saturated Y value is logically ORed with the result of the logical AND of the bits in the 7$^{th}$ and 6$^{th}$ bit positions of the saturated X value. This can be represented by the following pseudo-code:

$$T1=(sY<7> \& sY<6>)|(sX<7> \& sX<6>);$$

To determine the bit in the zero bit position, the result of the logical AND of the bits in the 7$^{th}$ and 6$^{th}$ bit positions of the saturated Y value is logically ORed with the result of the logical AND of the inverse of the bits in the 7$^{th}$ and 6$^{th}$ bit positions of the saturated X value. This can be represented by the following pseudo-code:

$$T0=(sY<7> \& sY<6>)|(!sX<7> \& !sX<6>);$$

In step 1370, bits in bit positions 5 through 0 of the saturated X and saturated Y coordinate values are interleaved to generate bits 11 to 0 of a 15-bit interim data bit field. The top bit field is then placed in bit positions 14 to 12 of the 15-bit interim data bit field.

In step 1380, the bits in the interim data bit field are shifted right by M places. In an embodiment, M is equal to 15 minus the size of the constellation (N). In addition, in step 1380, the relevant number of low order bits (i.e., those "shifted out" of the register) are discarded. The bits remaining in the interim data bit field are stored in the least significant bit positions of the lane in the destination register for the tone. In alternative embodiments, the bits are stored in other locations in the lane, e.g. in the most significant bit positions. The remaining bit positions in the lane are then filled with zeros. In alternative embodiments, other values may be stored into the remaining bit positions, or those bit positions may be left unmodified. As would be appreciated by persons of skill in the art, other techniques for shifting the data can be used with the present invention.

3. Conclusion

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method for performing, in a processor, quadrature amplitude modulation (QAM) decoding for a plurality of received input tones in parallel, comprising:
   (a) reading a constellation size for each of the plurality of input tones;
   (b) reading input data for each of the plurality of input tones, wherein the input data includes an x-coordinate value and a y-coordinate value;
   (c) for each of the plurality of input tones, determining, in parallel, an ideal point in a QAM constellation of the associated constellation size closest to a point having the x-coordinate value and y-coordinate value for the input tone, wherein step (c) is performed in a first manner for each of the plurality of input tones that have a constellation size that is an even value and in a second manner for each of the plurality of input tones that have a constellation size that is an odd value that is greater than or equal to five; and
   (d) storing a data value associated with the determined ideal point for each of the plurality of input tones in a destination register.

2. The method of claim 1, wherein the destination register is divided into a plurality of 16-bit half-word lanes, and each data value is stored in the least significant bit positions of one of the 16-bit half-word lanes.

3. The method of claim 1, wherein the input data for each of the plurality of input tones is represented using two's complement notation.

4. The method of claim 1, wherein step (c) includes:
   if the constellation size read in step (a) is an even value,
      (i) performing a saturation operation on the x-coordinate value to generate a saturated x-coordinate value;
      (ii) performing a saturation operation on the y-coordinate value to generate a saturated y-coordinate value;
      (iii) interleaving a number of bits of the saturated x-coordinate value and the saturated y-coordinate value to generate an interim data bit field;
      (iv) shifting bits in the interim data bit field by a number of bit positions, wherein the number of bit positions is a size of the interim data bit field minus the constellation size; and
      (v) storing the remaining bits in the interim data bit field in the associated lane of the destination register.

5. The method of claim 4, wherein step (c) (i) includes:
setting the saturated x-coordinate value to a first value, if the received x-coordinate value is less than a first value;
setting the saturated x-coordinate value to a second value if the received x-coordinate value is greater than or equal to a second value; and
setting the saturated x-coordinate value to the received x-coordinate value if the received x-coordinate value is greater than or equal to the first value and less than the second value.

6. The method of claim 5, wherein step (c) (ii) includes:
setting the saturated y-coordinate value to a first value, if the received y-coordinate value is less than a first value;
setting the saturated y-coordinate value to a second value if the received y-coordinate value is greater than or equal to a second value; and
setting the saturated y-coordinate value to the received y-coordinate value if the received y-coordinate value is greater than or equal to the first value and less than the second value.

7. The method of claim 1, wherein step (c) comprises:
if the constellation size read in step (a) is one,
   (i) computing the two's complement sum of the x-coordinate value and the y-coordinate value; and
   (ii) setting a one-bit value of the determined ideal point to the most significant data bit in the two's complement sum computed in step (i).

8. The method of claim 1, wherein step (c) comprises:
if the constellation size read in step (a) is three,
   (i) if the point having the x-coordinate value and y-coordinate value lies within a region without a decision line, setting a three-bit value of the determined ideal point to an ideal point associated with the region; and
   (ii) if the point having the x-coordinate value and y-coordinate value lies within a region with a decision line, wherein the decision line separates the region into a first sub-region and a second sub-region,
      (A) calculating a decision line value, wherein the decision line value determines a sub-region within the region containing the point having the x-coordinate value and y-coordinate value,
      (B) if the decision line value is one, setting the three-bit value of the determined ideal point to an ideal point associated with the first sub-region, and
      (C) if the decision line value is zero, setting the three-bit value of the determined ideal point to an ideal point associated with the second sub-region.

9. The method of claim 8, wherein step (c) (ii) (A) includes:
evaluating a formula that defines a slope of the decision line for the region using the received x-coordinate value and received y-coordinate value; and
setting the decision line value to a bit in the predetermined bit position of a data bit field containing the result of evaluating the formula.

10. The method of claim 9, wherein the decision line value is set to the bit in the fourth most significant bit position of the data bit field containing the result of evaluating the formula.

11. The method of claim 1, wherein step (c) further includes:
if the constellation size read in step (a) is odd and greater than or equal to five,
   (i) determining whether the point having the x-coordinate value and y-coordinate value lies within an inner region;
   (ii) if the point having the x-coordinate value and y-coordinate value lies within the inner region,
      (A) setting a saturated x-coordinate value to a number of bits of the x-coordinate value,
      (B) setting a saturated y-coordinate value to a number of bits of the y-coordinate value, and
      (C) setting a top data field to a first data value;
   (iii) if the point having the x-coordinate value and y-coordinate value does not lie within the inner region,
      (D) determining whether the point having the x-coordinate value and y-coordinate value lies closer to the x-axis than the closest location on a decision line does,
      (E) performing a first saturation operation on the x-coordinate value and y-coordinate value to determine a saturated x-coordinate value and a saturated y-coordinate value if the point lies closer to the x-axis than the closest location on the decision line does,
(F) performing a second saturation operation on the x-coordinate value and y-coordinate value to determine a saturated x-coordinate value and a saturated y-coordinate value if the point does not lie closer to the x-axis than the closest location on the decision line does, and
(G) setting the top data field to a second data value;
(iv) interleaving a number of bits of the saturated x-coordinate value and the saturated y-coordinate value to generate an interim data bit field;
(v) shifting bits in the interim data bit field by a number of bit positions, wherein the number of bit positions is a maximum constellation size minus the read constellation size;
(vi) storing the remaining bits in the interim data bit field in the associated lane of the destination register.

12. The method of claim 11, wherein step (c) (iii) further includes:
(A) determining the region containing the point having the x-coordinate value and y-coordinate value;
(B) calculating a decision line value;
(C) calculating a logical OR of a bit in a predetermined bit position of the y-coordinate value and the calculated decision line value;
(D) if the decision line value is one, determining that the point lies closer to the x-axis than the closest location on the decision line does; and
(E) if the decision line value is not one, determining that the point does not lie closer to the x-axis than the closest location on the decision line does.

13. The method of claim 12, wherein step (c) (iii) (B) includes:
evaluating a formula that defines a slope of the decision line using the received x-coordinate value and received y-coordinate value; and
setting the decision line value to a bit in the predetermined bit position of a data bit field containing the result of evaluating the formula.

14. The method of claim 11, wherein the first saturation operation comprises:
setting the saturated x-coordinate value to a first value, if the received x-coordinate value is less than a second value;
setting the saturated x-coordinate value to a third value if the received x-coordinate value is greater than or equal to an inverse of the second value;
setting the saturated x-coordinate value to the received x-coordinate value if the received x-coordinate value is greater than or equal to the second value and less than the inverse of the second value;
setting the saturated y-coordinate value to a fourth value, if the received y-coordinate value is less than a fifth value;
setting the saturated y-coordinate value to a sixth value if the received y-coordinate value is greater than or equal to an inverse of the fifth value; and
setting the saturated y-coordinate value to the received y-coordinate value if the received x-coordinate value is greater than or equal to the fifth value and less than the inverse of the fifth value.

15. The method of claim 14, wherein the second saturation operation comprises:
setting the saturated x-coordinate value to the fourth value, if the received x-coordinate value is less than the fifth value;
setting the saturated x-coordinate value to the sixth value if the received x-coordinate value is greater than or equal to the inverse of the fifth value;
setting the saturated x-coordinate value to the received x-coordinate value if the received x-coordinate value is greater than or equal to the fifth value and less than the inverse of the fifth value;
setting the saturated y-coordinate value to the first value, if the received y-coordinate value is less than the second value;
setting the saturated y-coordinate value to the third value if the received y-coordinate value is greater than or equal to an inverse of the second value; and
setting the saturated y-coordinate value to the received y-coordinate value if the received x-coordinate value is greater than or equal to the second value and less than the inverse of the second value.

16. A processor comprising:
a plurality of general purpose registers; and
at least one execution unit configured to decode at least one quadrature amplitude modulation (QAM) tone in response to a single instruction executable by the processor, by determining an ideal point in a QAM constellation, having an associated constellation size closest to a point associated with the input tone, wherein the at least one execution unit is configured to decode the at least one QAM tone in a first manner if the associated constellation size is an even value and in a second manner if the associated constellation size is an odd value that is greater than or equal to five,
wherein the at least one QAM tone is stored in one of the plurality of general purpose registers.

17. The processor of claim 16, wherein the processor comprises a plurality of execution units and wherein the plurality of execution units are configured to decode a plurality of QAM tones in parallel in response to a single instruction executable by the processor.

18. The processor of claim 17, wherein each of the plurality of execution units is configured to decode one of the plurality of QAM tones according to a constellation size associated with the one of the plurality of QAM tones.

19. A method for performing, in an execution unit in a processor, quadrature amplitude modulation (QAM) decoding for at least one received input tone, comprising:
(a) reading a constellation size for the at least one input tone;
(b) reading input data for the at least one input tone, wherein the input data includes an x-coordinate value and a y-coordinate value;
(c) determining an ideal point in a QAM constellation of the associated constellation size closest to a point having the x-coordinate value and y-coordinate value for the at least one input tone, wherein step (c) is performed in a first manner if the constellation size is an even value and in a second manner if the constellation size is an odd value that is greater than or equal to five; and
(d) storing a data value associated with the determined ideal point for the at least one input tone in a destination register,
wherein steps (a) through (d) are performed in response to a single instruction received by the execution unit.

20. The method of claim 19, wherein step (c) includes:
if the constellation size read in step (a) is an even value,
(i) performing a saturation operation on the x-coordinate value to generate a saturated x-coordinate value;
(ii) performing a saturation operation on the y-coordinate value to generate a saturated y-coordinate value;

(iii) interleaving a number of bits of the saturated x-coordinate value and the saturated y-coordinate value to generate an interim data bit field;
(iv) shifting bits in the interim data bit field by a number of bit positions, wherein the number of bit positions is a size of the interim data bit field minus the constellation size;
(v) storing the remaining bits in the interim data bit field in the destination register.

21. The method of claim 19, wherein step (c) comprises: if the constellation size read in step (a) is one,
    (i) computing the sum of the x-coordinate value and the y-coordinate value; and
    (ii) setting a one-bit value of the determined ideal point to the most significant data bit in the sum computed in step (i).

22. The method of claim 19, wherein step (c) comprises: if the constellation size read in step (a) is three,
    (i) if the point having the x-coordinate value and y-coordinate value lies within a region without a decision line, setting a three-bit value of the determined ideal point to an ideal point associated with the region; and
    (ii) if the point having the x-coordinate value and y-coordinate value lies within a region with a decision line, wherein the decision line separates the region into a first sub-region and a second sub-region,
        (A) calculating a decision line value, wherein the decision line value determines a sub-region within the region containing the point having the x-coordinate value and y-coordinate value,
        (B) if the decision line value is one, setting the three-bit value of the determined ideal point to an ideal point associated with the first sub-region, and
        (C) if the decision line value is zero, setting the three-bit value of the determined ideal point to an ideal point associated with the second sub-region.

23. The method of claim 19, wherein step (c) further includes:
    if the constellation size read in step (a) is odd and greater than or equal to five,
        (i) determining whether the point having the x-coordinate value and y-coordinate value lies within an inner region;
        (ii) if the point having the x-coordinate value and y-coordinate value lies within the inner region,
            (A) setting a saturated x-coordinate value to a number of bits of the x-coordinate value,
            (B) setting a saturated y-coordinate value to a number of bits of the y-coordinate value, and
            (C) setting a top data field to a first data value;
        (iii) if the point having the x-coordinate value and y-coordinate value does not lie within the inner region,
            (D) determining whether the point having the x-coordinate value and y-coordinate value lies closer to the x-axis than a closest location on a decision line does,
            (E) performing a first saturation operation on the x-coordinate value and y-coordinate value to determine a saturated x-coordinate value and a saturated y-coordinate value if the point lies closer to the x-axis than the closest location on the decision line does,
            (F) performing a second saturation operation on the x-coordinate value and y-coordinate value to determine a saturated x-coordinate value and a saturated y-coordinate value if the point is not closer to the x-axis, and
            (G) setting the top data field to a second data value;
        (iv) interleaving a number of bits of the saturated x-coordinate value and the saturated y-coordinate value to generate an interim data bit field;
        (v) shifting bits in the interim data bit field by a number of bit positions, wherein the number of bit positions is a maximum constellation size minus the read constellation size;
        (vi) storing the remaining bits in the interim data bit field in the destination register.

* * * * *

UNITED STATES PATENT AND TRADEMARK OFFICE
CERTIFICATE OF CORRECTION

Page 1 of 1

PATENT NO.       : 8,000,402 B2
APPLICATION NO.  : 11/642553
DATED            : August 16, 2011
INVENTOR(S)      : Mark Taunton It is certified that error appears in the above-identified patent and that said Letters Patent is hereby corrected as shown below:

In Column 18, line 24 please replace "size closest" with "size, closest".

Signed and Sealed this
Twenty-fifth Day of October, 2011

David J. Kappos
*Director of the United States Patent and Trademark Office*